(12) United States Patent
Saika

(10) Patent No.: US 7,487,390 B2
(45) Date of Patent: Feb. 3, 2009

(54) BACKUP SYSTEM AND BACKUP METHOD

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 456 days.

(21) Appl. No.: 11/448,861

(22) Filed: Jun. 8, 2006

(65) Prior Publication Data

US 2007/0234115 A1 Oct. 4, 2007

(30) Foreign Application Priority Data

Apr. 4, 2006 (JP) .............................. 2006-103047

(51) Int. Cl.
*G06F 11/00* (2006.01)
(52) U.S. Cl. ...................................................... 714/13
(58) Field of Classification Search ................. 714/2–9, 714/11–13, 15, 16, 18–20, 25, 26, 31, 47
See application file for complete search history.

(56) References Cited

U.S. PATENT DOCUMENTS

| | | | | |
|---|---|---|---|---|
| 2002/0069317 A1* | 6/2002 | Chow et al. | ................. | 711/104 |
| 2002/0069334 A1* | 6/2002 | Hsia et al. | ................... | 711/147 |
| 2003/0172093 A1* | 9/2003 | Nagoya | ...................... | 707/204 |
| 2004/0181707 A1* | 9/2004 | Fujibayashi | ..................... | 714/6 |
| 2005/0228947 A1* | 10/2005 | Morita et al. | ............... | 711/114 |
| 2005/0289390 A1* | 12/2005 | Baba | .......................... | 714/11 |
| 2008/0155306 A1* | 6/2008 | Combs | ........................... | 714/3 |
| 2008/0219156 A1* | 9/2008 | Caviglia et al. | ............. | 370/228 |

FOREIGN PATENT DOCUMENTS

JP 2005-301560 10/2005

* cited by examiner

*Primary Examiner*—Nadeem Iqbal
(74) *Attorney, Agent, or Firm*—Mattingly, Stanger, Malur & Brundidge, PC

(57) ABSTRACT

Provided is a method causing a node of a local site or of a remote site to take over a file server when a failure occurs to a node of the local site. The method includes the steps of: setting a priority of the failover to the respective nodes of the local site; setting a failover destination of the respective nodes of the local site to a node of the remote site or the local site based on correspondences between the priority and an extent of the failover destination set in advance; backing up data to respective nodes of the determined failover destination; causing the failover destinations and nodes to mutually detect a failure; and causing a node of the failover destination to take over a task if the node of the failover destination detects a failure.

17 Claims, 23 Drawing Sheets

400 TAKEOVER INFORMATION

401 SERVER INFORMATION TABLE

402 SERVICE IP TABLE

403 USER INFORMATION TABLE

404 TAKEOVER HISTORY TABLE

405 PRIORITY SETTING INFORMATION

401 SERVER INFORMATION TABLE

| FILE SERVER NAME | BELONGING SITE | BELONGING RAID SUBSYSTEM NAME | MANAGEMENT IP ADDRESS | CLUSTER STATUS | NUMBER OF SERVICE IP ADDRESSES | PRIORITY | FAILOVER DESTINATION RAID SUBSYSTEM NAME |
|---|---|---|---|---|---|---|---|
| SV1 | LOCAL | NAS#1:LU131 | 192.168.0.1 | CLUSTERED | 3 | C | NAS#1:LU132 |
| SV2 | LOCAL | NAS#2:LU132 | 192.168.0.10 | CLUSTERED | 5 | B | NAS#1:LU133 |
| SV3 | LOCAL | NAS#2:LU134 | 192.168.0.20 | CLUSTERED | 2 | A | NAS#3:LU134 |
| .. | .. | .. | .. | .. | .. | .. | .. |
| SVx | REMOTE | NAS#3:LU134 | 192.168.1.30 | NOT CLUSTERED | 5 | B | - |
| .. | .. | .. | .. | .. | .. | .. | .. |
| | 4012 | 4013 | 4014 | 4015 | 4016 | 4017 | 4018 |

402 SERVICE IP TABLE

| SERVER NAME | SERVICE IP ADDRESS 1 | NUMBER OF FILE SYSTEMS | ... | FILE SYSTEM INFORMATION 1 | ... | FILE SYSTEM INFORMATION n |

| SERVER NAME | SERVICE IP ADDRESS m | NUMBER OF FILE SYSTEMS | ... | FILE SYSTEM INFORMATION 1 | ... | FILE SYSTEM INFORMATION k |

4021 4022 4023 4024 4024

403 USER INFORMATION TABLE

| SERVER NAME | NUMBER OF USER ACCOUNTS | USER ACCOUNT INFORMATION 1 | ... | USER ACCOUNT INFORMATION i |
|---|---|---|---|---|
| | | | : | |
| SERVER NAME | NUMBER OF USER ACCOUNTS | USER ACCOUNT INFORMATION 1 | ... | USER ACCOUNT INFORMATION i |
| 4031 | 4032 | 4033 | | 4033 |

*FIG. 9*

404 FAILOVER HISTORY TABLE

| MANAGEMENT IP ADDRESS | DATE AND TIME OF TAKEOVER | MAC ADDRESS | NUMBER OF FAILOVERS | DATE AND TIME OF CREATION |
|---|---|---|---|---|
| 192.168.0.1 | | aa:bb:cc:dd:ee:fe | 0 | YY:MMDD HH:MM:S1 |
| 192.168.0.1 | YY:MMDD HH:MM:S2 | aa:bb:cc:dd:ee:de | 1 | YY:MMDD HH:MM:S2 |
| 192.168.0.10 | YY:MMDD HH:MM:S3 | aa:bb:cc:dd:ee:cc | 0 | YY:MMDD HH:MM:S3 |
| 192.168.0.10 | YY:MMDD HH:MM:S4 | aa:bb:cc:dd:ee:c0 | 1 | YY:MMDD HH:MM:S4 |
| 192.168.0.10 | YY:MMDD HH:MM:S5 | aa:bb:cc:dd:ee:c1 | 2 | YY:MMDD HH:MM:S5 |
| : | : | : | : | : |
| : | : | : | : | : |
| 4041 | 4042 | 4043 | 4044 | 4045 |

FIG. 10

1300 LOG

| # | DATE AND TIME | DIRECTORY PATH NAME | USER ID |
|---|---|---|---|
| 1 | 2006/2/27 13:10:05 | /share/nfs·share11 | User001 |
| 2 | 2006/2/27 13:10:06 | /share/nfs·share12 | User005 |
| 3 | 2006/2/27 13:10:07 | /share/cifs·share11 | User002 |
| 4 | 2006/2/27 13:10:07 | /share/cifs·share12 | User003 |
| : | | : | : |
| 5 | 2006/2/27 13:31:23 | /home/user013 | User001 |
| 6 | 2006/2/27 13:31:28 | /home/user013 | User002 |
| 7 | 2006/2/27 13:31:29 | /home/user013 | User005 |
| : | | : | : |
| | | | |

BACKUP SYSTEM AND BACKUP METHOD

CLAIM OF PRIORITY

The present application claims priority from Japanese application P2006-103047 filed on Apr. 4, 2006, the content of which is hereby incorporated by reference into this application.

BACKGROUND

This invention relates to improvements of technologies used to back up files stored in storage systems.

There is known a failover process in which multiple computers are used for a backup, and if one computer fails, other computer takes over a task.

For example, multiple nodes form a cluster, the nodes mutually monitor an occurrence of a failure, and a normal node takes over a process of a failed node (refer to JP 2005-301560 A, for example).

SUMMARY

As a destination in the above failover process may be a node in a remote site as well as an adjacent node in a local site. Moreover, when multiple file servers are running in a node (a computer incorporating multiple blade servers in a node, or a computer virtually running multiple file servers in a node), the failover process can be executed in a node.

There pose the following problems if there are available multiple options for a destination of a failover such as a node in a remote site in addition to the same node and other node in a local site.

If failures occur to multiple nodes in a local site, and failovers of all of them are destined to a remote site, there is executed the failover process for all the nodes, and there thus may occur a recovery delay (delay due to forwarding) or the like to nodes which require a prioritized recovery.

Moreover, if a failover is destined to the same node or another node in a local site, and the scale of a failure (disaster) extends as time elapses in case of a disaster and the like, an additional failover may occur after the failover. In this case, the amount of tasks to be taken over may increase, loads on nodes which takeover tasks may increase, or tasks may be frequently interrupted due to multiple number of failovers. As a result, if tasks provided by the respective nodes have different priorities in recovery (takeover), there poses such a problem that an adverse effect may be exerted on nodes with high priorities for which a recovery from the failure and a recovery of a delay of tasks are urgent.

If there are mixed nodes with high and low priorities in tasks to be provided, since the failover process is executed regardless of the priority according to prior art described above, there are possible delays in the takeover for the nodes with the high priorities as described above.

Moreover, though the failover process is preferably executed before an occurrence of a failure to a node which provides a task with a high priority, there poses a problem in that the failover process cannot be executed until a failure occurs to the node according to the above conventional example.

It is therefore an object of this invention to determine a sequence of failover process according to the priority of nodes, thereby preventing a delay in a recovery of nodes with high priorities.

According to this invention, there is provided a failover method used for a system, the system including:
a primary site having:
multiple nodes that provide a task; and
a first storage system allocated to the nodes; and
a secondary site having:
multiple nodes that can provide a task; and
a second storage system allocated to the nodes,
the method allowing, if a failure occurs to a node of the primary site, the task to be taken over by a node of the primary site or a node of the secondary site,
the method including the steps of:
setting a priority of a failover for the respective nodes of the primary site;
setting a failover destination of the respective nodes of the primary site to either one of a node of the secondary site and a node of the primary site based on a correspondence set in advance between a priority and an extent of the failover destination;
backing up data from a node of the primary site to a node of a determined failover destination;
causing the node of the failover destination and the node of the primary site to mutually detect a failure; and
causing the node of the failover destination to take over a task if the node of the failover destination detects a failure of the node of the primary site.

Moreover, the secondary site detects the number of failures which have occurred to the primary site, and when the number of the failures exceeds a predetermined upper limit, a task of a node of the primary site to which the first priority is set is taken over in advance even if a failure is not occurring to the node.

According to this invention, destinations of the failover are changed according to the priority of tasks provided by respective nodes, simultaneous failover processes for a node with a high priority and a node with a low priority to the same destination which takes over the tasks are thus prevented, and an adverse effect such as a delay in a recovery of the node with the high priority can be reduced.

Moreover, a failover to a remote site is carried out for a node which provides a task with a high priority before a failure occurs to itself (when a failure occurs to nodes in the neighborhood), and a failover is carried out after a failure for a node which does not provide a task with a high priority, thereby providing a difference in time for the failover processes according to the priority, resulting in a decrease of the adverse effect such as the delay in a recovery for the node with the high priority.

BRIEF DESCRIPTION OF THE DRAWINGS

FIG. 6 is a block diagram showing an overview of takeover information stored in a shared LU of respective NAS systems.

FIG. 7 is a diagram describing an example of a server information table constituting the takeover information.

FIG. 8 is a diagram describing an example of a service IP table constituting the takeover information.

FIG. 9 is a diagram describing an example of a user information table constituting the takeover information.

FIG. 10 is a diagram describing an example of a takeover history table constituting the takeover information.

FIG. 11 is a diagram describing an example of an access log produced by respective file servers.

DETAILED DESCRIPTION OF THE PREFERRED EMBODIMENTS

A description will now be given of an embodiment of this invention based on the accompanying drawings.

Figure 1:
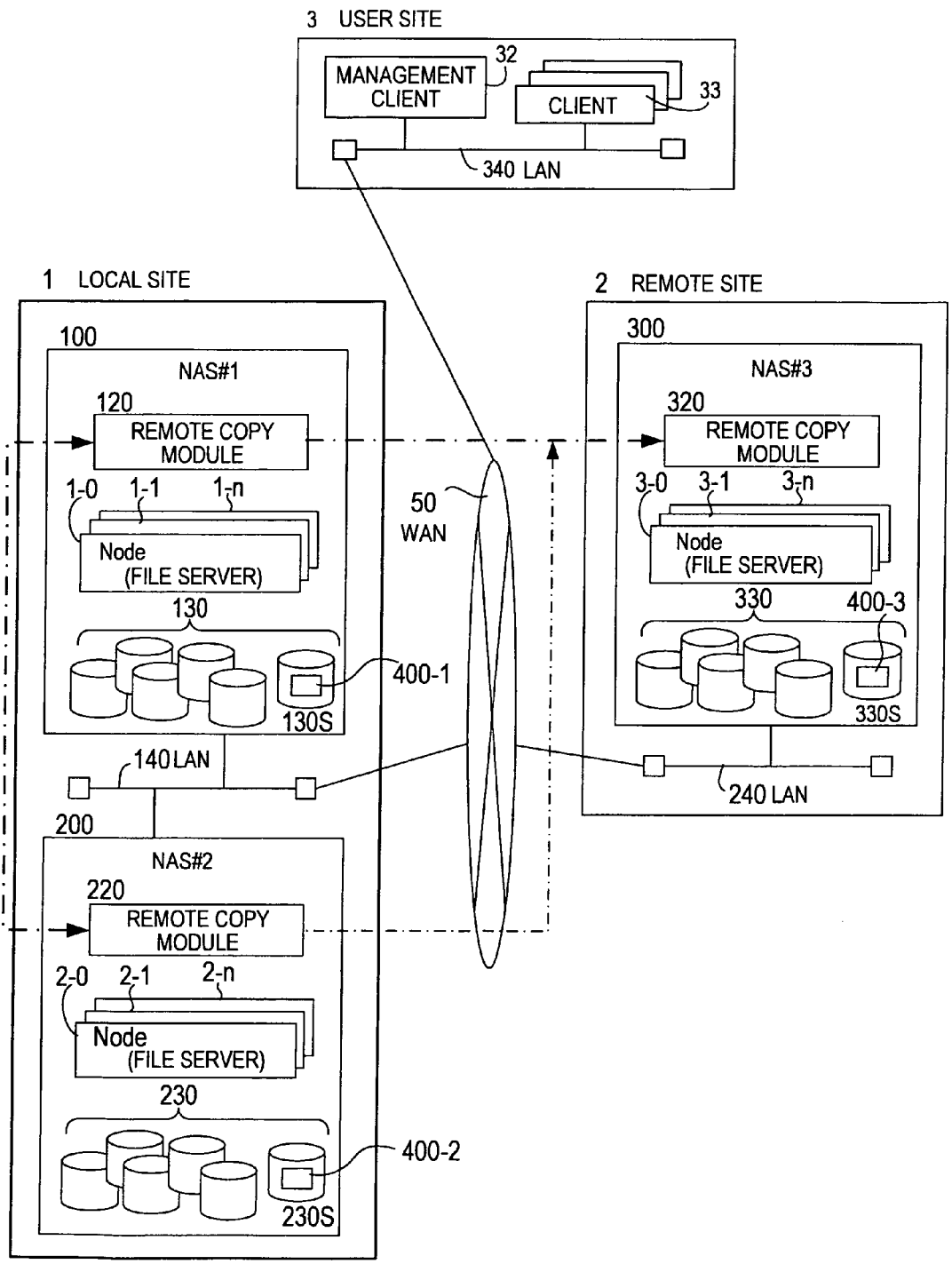
FIG. 1 is a block diagram showing an overall configuration of a system.

FIG. 1 is a block diagram showing an overall configuration of a computer system when this invention is applied to NAS (Network Attached Storage) systems serving as a storage system.

In FIG. 1, a local site 1 (or primary site) which provides tasks is constructed by multiple NAS's 100 and 200, and is connected to a WAN (network) 50 via a LAN 140. To the WAN 50 are connected a user site 3 which uses file servers (tasks) provided by the local site 1, and a remote site 2 (or secondary site) which backs up data and the like of the local site 1, and takes over tasks (file sharing module or the file server) when a failure occurs to the local site 1. Moreover, NAS's 100 and 200 mutually carry out a backup and a failover process in the local site 1.

The NAS 100 in the local site 1 includes multiple nodes 1-0 to 1-$n$ configured as clusters, and these nodes 1-0 to 1-$n$ respectively provide the file sharing module (file server). It should be noted that the nodes 1-0 to 1-$n$ are configured as an NAS head constituting a server computer as described later.

The NAS 100 includes a RAID disk subsystem 130 which provides multiple disk drives, which are configured as a RAID by a storage controller described later, as multiple logical units (logical volumes). At least one shared LU 130S is set to the RAID disk subsystem 130. This shared LU 130S can be shared by nodes in the local site 1 and nodes in the remote site 2.

Moreover, a remote copy unit (module) 120 of the storage controller duplicates contents of the logical units 130 to other NAS in the local site 1 and the remote site 2, thereby realizing a backup. Moreover, the remote copy unit (module) 120 accepts a backup from the other NAS 200 in the local site 1, and takes over the file sharing module of the NAS 200 on an occurrence of a failure in the NAS 200.

The NAS 200 provides the user site 3 with the file sharing module, and carries out a backup and a failover process for the NAS 100 in the local site 1. The configuration of the NAS 200 is similar to that of the NAS 100, and multiple nodes 2-0 to 2-$n$ configured as clusters can provide the file sharing module. Moreover, the NAS 200 includes a RAID disk subsystem 230 which provides multiple disk drives, which are configured as a RAID by the storage controller described later, as multiple logical units (logical volumes), and at least one shared LU 230S is set to the RAID disk subsystem 230 as in the NAS 100. Moreover, a remote copy unit (module) 220 of the storage controller duplicates contents of the logical units 230 to other NAS in the remote site 2, thereby realizing a backup.

The NAS's 100 and 200 are connected with each other via the LAN 140 to configure the local site 1.

The remote site 2 includes an NAS 300, and is constructed at a location geographically separated from the local site 1. The NAS 300 carries out the backup and takes over tasks for the local site 1. The configuration of the NAS 300 is similar to that of the NAS 100, and multiple nodes 3-0 to 3-$n$ configured as clusters can provide the file sharing module. Moreover, the NAS 300 includes a RAID disk subsystem 330 which provides multiple disk drives, which are configured as a RAID by the storage controller described later, as multiple logical units (logical volumes), and at least one shared LU 330S is set to the RAID disk subsystem 330 as in the NAS 100. Moreover, a remote copy unit (module) 320 of the storage controller receives data of the NAS 100 and NAS 200 of the local site 1, and stores the data in the RAID disk subsystem 330. It should be noted that a LAN 240 is connected to the WAN 50, and the NAS 300 is connected to the LAN 240 in the remote site 2.

The logical volume can be duplicated between the RAID disk subsystems of the local site 1 and the remote site 2 by means of the remote copy, and contents of a file system are duplicated from the local site 1 to the remote site 2 by means of the above remote copy module. It should be noted that timing of the remote copy can be arbitrarily set to synchronous or asynchronous.

Moreover, duplication of data possessed by nodes is mutually carried out by means of the remote copy module between the NAS 100 and the NAS 200 in the local site 1.

The user site 3 includes a LAN 340 connected to the WAN 50, multiple client computers 33 connected to the LAN 340, and a management client computer 32 for managing the local site 1 and the remote site 2.

The client computer 33 uses the file sharing module provided by the NAS 100 of the local site 1 to refer to and update files. The management client computer 32 sets the NAS's 100 and 200 of the local site 1, and the NAS 300 of the remote site 2.

Figure 2:
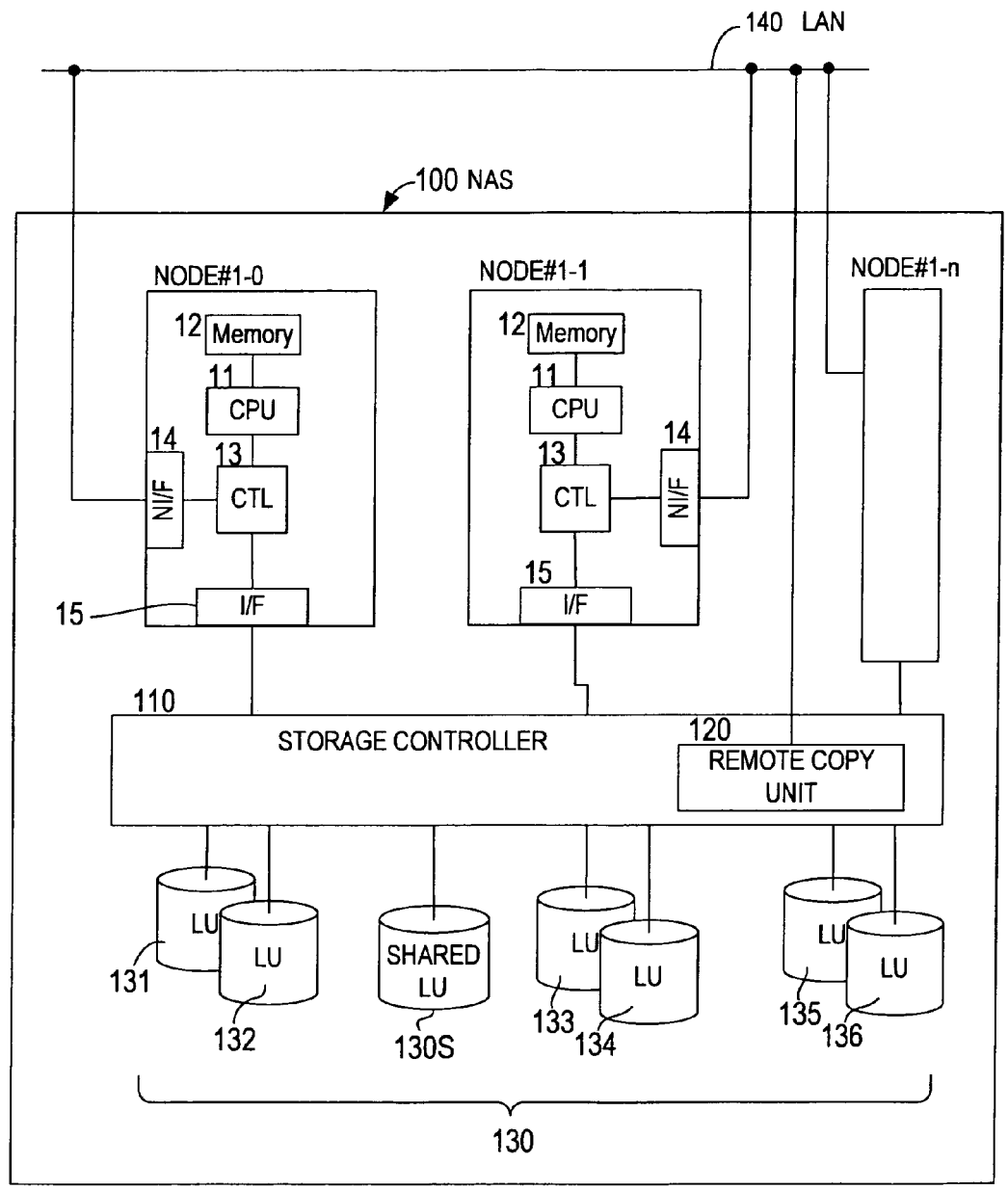
FIG. 2 is a block diagram showing a hardware configuration of respective NAS systems.

FIG. 2 is a block diagram showing an example of hardware of the NAS 100 in the local site 1. The NAS's 200 and 300 have the same configuration as that of the NAS 100, and the NAS's 200 and 300 thus have the configuration and modules of the NAS 100 described later.

The configuration of the NAS 100 includes the multiple nodes 1-0 to 1-n, a storage controller 110, and the RAID disk subsystem 130.

The respective nodes 1-0 to 1-n of the NAS 100 include a CPU 11 which carries out arithmetic processing, a memory 12 for temporarily storing programs and data, a data transfer controller 13 for controlling the CPU 11 and I/O accesses, and a network interface 14 connected to the LAN 140, and a storage interface 15. It should be noted that a data cache (not shown) may be provided for the memory 12 or for the data transfer controller 13.

A control program (described later) is loaded in the memory 12, and the CPU 11 calls and executes the control program to execute various processes described later.

The data transfer controller 13 transfers data among the CPU 11, the network interface 14, and the storage interface 15.

The nodes 1-0 to 1-n of the NAS 100 are configured as clusters, and respectively serve as the file server providing the file sharing module. To the respective nodes 1-0 to 1-n are assigned the logical units (referred to as LU hereinafter) 131 to 136 of the RAID disk subsystem 130. It should be noted that the shared LU 130S is shared by the nodes 1-0 to 1-n in the same enclosure and other NAS's as described above.

Then, the remote copy unit 120 duplicates data (files) in the LU's 131 to 136 to the predetermined NAS 200 or NAS 300.

Moreover, a failover unit described later is running on the respective nodes 1-0 to 1-n, and takes over the file sharing module when a failure occurs to the nodes 1-0 to 1-n as described later.

It should be noted that the RAID disk subsystems 230 and 330 of the respective NAS's 200 and 300 have the multiple LU's 131 to 136 as in the NAS 100.

Figure 3:
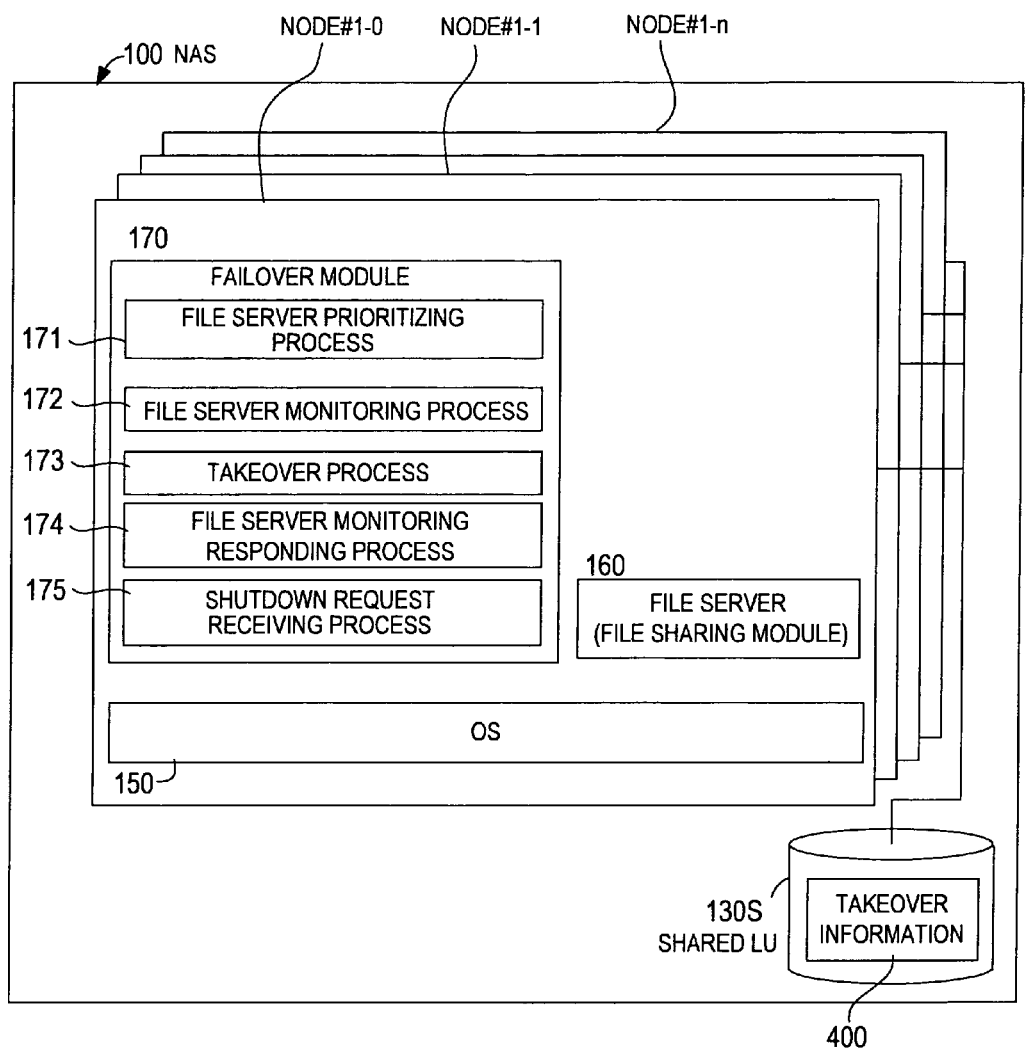
FIG. 3 is a block diagram showing a configuration of software executed on nodes in a local site.

FIG. 3 is a block diagram showing a software configuration of the NAS's 100 and 200 of the local site 1. Since the NAS's 100 and 200 of the local site 1 have the same configuration, a description will be given only of the configuration of the NAS 100, and a description of the NAS 200 is thus omitted.

An OS (NAS OS) 150 is running on the respective nodes 1-0 to 1-n of the NAS 100, and on the OS 150 are executed the file sharing module (file server) 160 which provides the client computers 33 with a predetermined file system, and a failover module 170 which executes the failover process if a failure occurs to the node itself or other nodes. It should be noted that modules and processes executed on the respective nodes are implemented as programs.

The file sharing module (referred to as file server hereinafter) 160 provides the client computers 33 connected to the networks (LAN 140 and WAN 50) with the file sharing protocol (NFS and CIFS), thereby providing the file sharing module among the client computers 33. The file server 160 receives a request (reference and update) per file from the client computers 33, and executes an I/O (read/write) to/from the file system on a file basis.

In the failover module 170, two file servers are configured as a cluster between nodes or within a node, are mutually monitored, and tasks are taken over from one of the two file servers whose node goes down due to a failure or the like.

The failover module 170 is constituted by a file server prioritizing process 171 for determining a priority of the file server 160 in the NAS 100, a file server monitoring process 172 for monitoring an operation state of file servers in other nodes within the same NAS 100 or in other nodes in the same local site 1, a takeover process 173 for passing over the file server 160, which is presently being provided, to other node if a failure occurs to the node itself or neighboring nodes, a file server monitoring responding process 174 for responding an operation state of the node itself to the file server monitoring process 172 of other node, and a shutdown request receiving process 175 for receiving a shutdown request from other node.

Various information used for the failover is stored as takeover information 400-1 for the respective NAS systems in the shared LU 130S of the NAS 100 to which the respective nodes 1-0 to 1-n belong. Namely, as shown in FIG. 1, the shared LU 130S of the NAS 100 of the local site 1 stores the takeover information 400-1 retaining resource information on the file servers 160 in the NAS 100, the shared LU 230S of the NAS 200 of the local site 1 stores takeover information 400-2 retaining resource information on the file servers 160 in the NAS 200, and the shared LU 330S of the NAS 300 of the remote site 2 stores takeover information 400-3 retaining resource information on the file servers 160 in the NAS 300. It should be noted that a generic name of the takeover information of the respective NAS systems hereinafter is referred to as takeover information 400, and respective pieces of the takeover information of the NAS systems are distinguished as takeover information 400-1 to 400-3. It should be noted that the respective NAS systems include at least one shared LU, and one of them stores the takeover information 400.

Moreover, pieces of the takeover information 400 of the respective shared LU's are synchronized by delivering the takeover information 400 on the file servers 160 of the own NAS system to the shared LU's of other NAS systems. The remote copy module of the respective NAS systems can be used for the process to mutually deliver the takeover information 400.

In the NAS 200 of the local site 1, the shared LU 230S stores the takeover information 400-2 of the respective nodes 2-0 to 2-n.

When the file server 160 of other node is taken over to the node itself, the failover module 170 executes the failover process based on the takeover information 400 stored in the shared LU of the NAS to which the source node of the file server 160 to be taken over belongs.

Moreover, the takeover information 400 also stores information on a file server 160 which has been taken over as a result of a failover.

Figure 4:
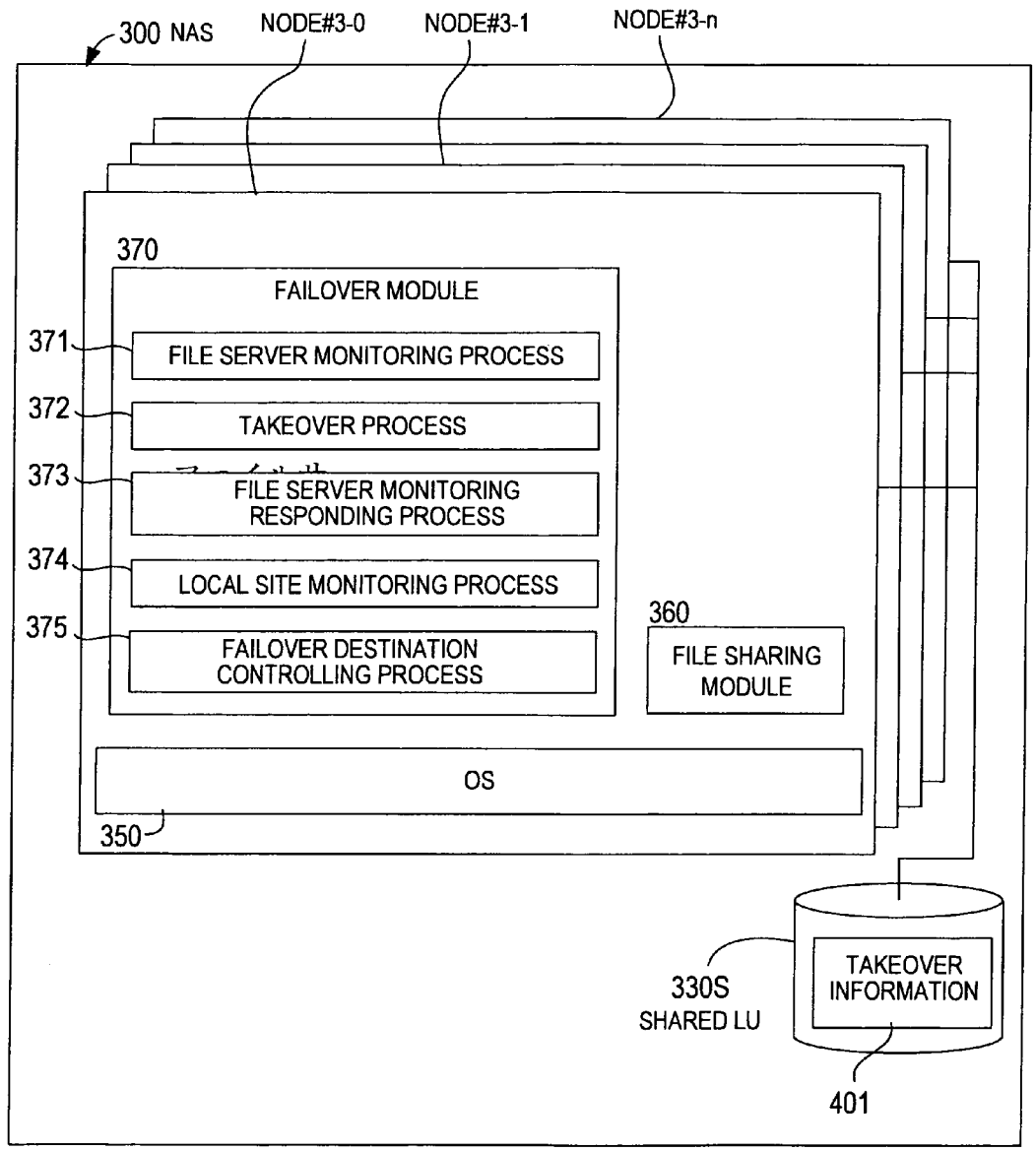
FIG. 4 is a block diagram showing a configuration of software executed on nodes in a remote site.

FIG. 4 is a block diagram showing a software configuration of the NAS 300 of the remote site 2.

An OS (NAS OS) 350 is running on the respective nodes 3-0 to 3-n of the NAS 300, and on the OS 350 are executed a file sharing module (file server) 360 which can provide the client computers 33 with a predetermined file system, and a failover module 370 which executes the failover process if a failure occurs to the node itself or other nodes.

The failover module 370 includes a file server monitoring process 371 for monitoring an operation state of other file servers in other nodes within the same NAS 300 or file servers in local site 1, a takeover process 372 for taking over the file server 160 presently being provided to the node itself if a failure occurs to the node itself or neighboring nodes, a file server monitoring responding process 373 for responding an operation state of the node itself to the file server monitoring process of other nodes, a local site monitoring process 374 for monitoring an occurrence of a failure in the local site 1, and a failover destination controlling process 375 for determining a node whose file server 160 is to be taken over.

On this occasion, information on the file server 160 of the local site 1 taken over by the remote site 2 is stored as takeover information 400-3 of the shared LU 330S by the takeover process 372. When the file server 160 which has been taken over is returned to the local site 1, contents of the takeover information 400-3 are written to the takeover information 400-1 and 400-2 of the shared LU's 130S and 230S in the local site 1.

<Overview of Failover Process>

A description will now be given of an overview of this invention based on a schematic diagram showing relationships among nodes in FIG. 5.

Figure 5:
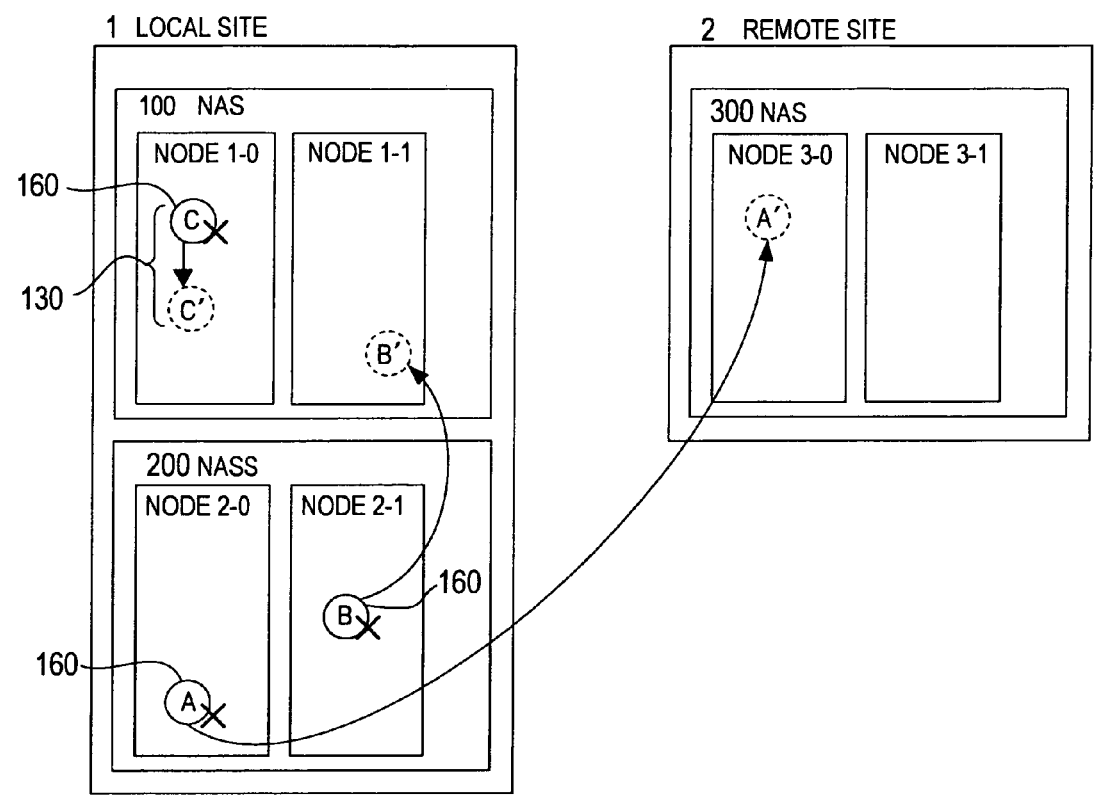
FIG. 5 is a block diagram showing a failover between the nodes of the local site and the remote site according to priorities.

FIG. 5 shows an example in which the NAS 100 of the local site 1 provides the file server 160 in the node 1-0, and the NAS 200 provides the file servers 160 in the nodes 2-0 and 2-1.

The file servers 160 of the respective nodes have a priority of the failover according to the number of users who have access thereto, the size of stored files, and the like. For example, in the shown example, the file server 160 of the node 2-0 is set to a priority A which is the highest priority, the file server 160 of the node 2-1 is set to a priority B which is the second highest priority, and the file server 160 of the node 1-0 is set to a priority C which is the third highest priority.

According to this invention, since the priority is configured as A>B>C in the descending order, the failover of the file server 160 with the priority A can be destined to the remote site 2, and the failover of the file server 160 with the priority B is limited to the node (1-1) in the local site 1. Moreover, the failover of the file server 160 with the lowest priority C is limited to other node in the same NAS system. When one node provides multiple file servers 160, other file server 160 of the same node is a destination of the takeover. A geographically farther site is set to the destination of a takeover as the priority of the failover increases, and a geographically closer site is set to the destination of the takeover as the priority decreases.

Moreover, by means of the monitoring between the local site 1 and the remote site 2, if a large number of failures (failovers) are occurring in the local site 1, the failover of the file server 160 with the priority A which is running can be carried out to the remote site 2 in advance. Namely, the remote site 2 monitors failovers in the local site 1, and if the remote site 2 detects that failovers are frequently occurring in the local site 1 due to a disaster or a failure, the failover to the remote site 2 can be completed before a failure occurs to the file server 160 with the priority A. Namely, the remote site 2 carries out the failover before a failure occurs to the file server 160 with the high priority based on an overall trend of the failures of the local site 1.

When a certain period has elapsed after the failover of the file server 160 with the priority A to the remote site 2, the restrictions on the destinations of the failovers according to the respective priorities is mitigated (a failover to the remote site 2 is permitted for the priority B, for example). As a result, after the failover of the file server 160 with the high priority has been completed, the file server 160 with the low priority can be taken over to the remote site 2, and it is thus possible to promptly carry out recovery of NAS's from a disaster or a failure according to the priority.

To achieve the above process, the failover modules 170 and 370 according to this invention carry out setting along the following steps.

(1) Determination Rules and Failover Destinations Setting

Determination rules used to set the priorities of the file servers 160 in the local site 1 (priority setting information), and destinations of the failover for the respective priorities are registered to the takeover information 400. It should be noted that an administrator of the local site 1 or the remote site 2 sets the priority setting information from the management client 32 of the user site 3.

The administrator sets initial values of the failover destinations for the respective file servers 160 from the management client 32. Moreover, the administrator assigns LU's to respective nodes of the respective NAS systems from the management client 32. For example, LU's 131 and 132 are assigned to the node 1-0 of the NAS 100, and LU's 133 and 134 are assigned to the node 1-1.

(2) Priority Setting for File Servers

For the file servers 160 of the respective nodes 1-0 to 1-$n$ and 2-0 to 2-$n$, the priorities are periodically updated by periodically monitoring usage of the file servers 160, such as the number of users who have access, the capacity of stored data, and the like, as described later. The priorities for the respective file servers 160 are respectively stored in the takeover information 400-1 to 400-3 of the shared LU's 130S, 230S, and 330S. Moreover, the resource information (IP address, file system, user account information, and the like) of the respective filer servers 160 is stored in advance in the takeover information 400-1 to 400-3 of the shared LU's 130S, 230S, and 330S.

(3) Cluster Construction and Monitoring Process of File Servers

A cluster is constituted by a pair of file servers 160 with the same priority in the respective nodes. The cluster configuration is initially set by the administrator from the management client 32 or the like. The file servers 160 constituting the cluster mutually monitor failures by means of the file server monitoring process 172 of the failover module 170.

(4) Failover Process

When a failure of the file server 160 is detected, a node of the takeover destination obtains the resource of the failed file server 160 from the takeover information 400 of the shared LU, and carries out the failover process. Then, the node of the takeover destination resumes the file server 160 (360).

(5) Cluster Reconstruction After Failover

The file server 160 (360) for which the failover has been completed finds out a possible new takeover destination to reconstruct a cluster. It should be noted that the takeover destination is limited according to the priority of the file server as described below.

Low Priority

Failover in the same enclosure (other node of the RAID disk subsystem, other server in the same node) can be carried out.

Medium Priority

Failover to other NAS in the local site 1 can be carried out.

High Priority

Failover to the remote site 2 can be carried out.

A new takeover destination determined based on the above restrictions is stored in takeover information 400 of a shared LU of the node of the new takeover destination.

A priority which does not cause a failover may be set to a node with the lowest priority. Namely, failover is not carried out intentionally for files and the like which will not cause a problem of tasks.

(6) Monitoring Local Site from Remote Site

The occurrence of failovers in the local site 1 is monitored from the remote site 2, and if the number of failovers exceeds a threshold within a certain period, file servers 160 with the high priorities running on the local site 1 are failed over to the remote site 2. As a method for monitoring the occurrence of the failover, the Address Resolution Protocol (ARP) can be used to count the number of changes of the MAC address of the respective file serves 160 in the local site 1. Namely, when a file server 160 to which a certain IP address is assigned is changing the MAC address frequently, the file server 160 is frequently changing the node. It is thus possible to obtain the number of the executed failovers by monitoring the number of the changes of the MAC address corresponding to the IP address.

(7) Control to Change Failover Destination

When a certain period has elapsed after the file server 160 with the high priority has been failed over to the remote site 2, the extent of the destination of the failover is extended for the file servers 160 with the medium or low priority in the local site 1. For example:

Low Priority

Failover to other NAS system in the local site 1 can be carried out.

Medium Priority

Failover to the remote site 2 can be carried out.

If a failover occurs to other file server 160 with the high priority after the change of the failover destinations, the failover destinations may be restored to a basic state described in (5).

<Details of Takeover Information>

A description will now be given of the takeover information which is stored in the shared LU and describes the resources of the file server 160 to be taken over.

The respective pieces of the takeover information 400-1 to 400-3 store setting and history of file servers 160 executed on nodes of the NAS's to which the shared LU's (130S, 230S, and 330S) belong, and are provided for nodes of the takeover destinations.

FIG. 6 is a block diagram showing an example of information constituting the takeover information 400. The takeover information 400 includes: a server information table 401 for storing setting information of the file servers 160 of the NAS system to which the shared LU belongs; a service IP table 402 for storing an IP address of the file sharing module which is provided for client computers 33 and is set for the respective file servers 160; and information on the file system; a user information table 403 for storing account information of users for the respective file servers 160; a takeover history table 404 for storing the history of the MAC address of the file servers 160; and priority setting information 405 for storing the thresholds used to set the priority, the extents of the failover destination, and the like.

FIG. 7 shows an example of the server information table 401 stored in the shared LU's 130S, 230S, and 330S of the respective NAS's 100 to 300.

In FIG. 7, in an entry of the server information table 401 is stored the setting information corresponding to a file server name 4011. A belonging site 4012 indicates the location of the file server 160, and either the local site 1 or the remote site 2 is set thereto.

A belonging RAID subsystem name 4013 stores the name (or identifier) of an NAS system and the storage area (the LU name) which are presently assigned to the file server 160 identified by the file server name 4011.

The management IP address 4014 stores a management IP address assigned to the file server name 4011 in advance by the administrator to manage or monitor the file server 160. The failover process uses the management IP address 4014 to detect a heartbeat and to search for a file server on the cluster construction.

A cluster status 4015 indicates whether this file server is constituting a cluster or not, and is set to "Clustered" when the file server is constituting a cluster, "Not Clustered" when the file server is not constituting a cluster, or "In Failure" when a failure is occurring to the file server. It should be noted that "Not Clustered" is initially set to the cluster status 4015.

A number of service IP addresses 4016 indicates the number of service IP addresses used to provide the client computers 33 with the file sharing module. The service IP addresses are set in advance by the administrator.

A priority 4017 contains a value used to control a failover destination determined according to the number of accessing users of the file server, an access frequency, the capacity of stored files, and the like. For example, to the priority 4017 is set any one of "A" to "C" as described above.

A failover destination RAID subsystem name 4018 contains a name (or identifier) of an NAS system of a takeover destination and an LU number when the cluster status 4015 is "Clustered". It should be noted that the failover destination RAID subsystem name 4018 may contain the identifier of the NAS system and an identifier of the node.

The file server name 4011, the management IP address 4014, and the number of service IP addresses 4016 are set by the administrator, and statically used in the server information table 401. On the other hand, when a failover is carried out for a file server, and when a node running the file server changes, the belonging RAID subsystem name 4013 is changed. It should be noted that the correspondence between the management IP address and the MAC address is to be changed as a result of the change of the node on this occasion.

FIG. 8 shows the service IP table 402 provided by a file server 160. The service IP table 402 stores relationships between a service IP address and a file system provided by the file server 160 for the client computers 33. One entry is constituted by a server name 4021, one service IP address 4022 provided by a server specified by the server name 4021 for the client computers 33, a number of file systems 4023 provided using this service IP address, and file system information 4024 corresponding to the number of the file systems 4023. The file system information 4024 is information on a file system on the file server 160 shared by the client computers 33, and contains a file system name, a mount point, and the like. The service IP table 402 is set by the administrator from the management client 32.

FIG. 9 shows an example of the user information table 403 which stores user account information received by a file server 160. The user information table 403 stores a number of user accounts 4032 accepted corresponding to a server name 4031 and user account information 4033 corresponding to the number of user accounts 4032. The user account information 4033 stores an ID, a password, and the like of a user who has accessed the file server. It should be noted that the user information table 403 is set by the administrator from the management client 32.

FIG. 10 shows an example of the takeover history table 404 which stores correspondences between a management IP address of a file server 160 of the local site 1 and an MAC address.

One entry of the takeover history table 404 stores, corresponding to a management IP address 4041, date and time of takeover 4042, a node MAC address 4043 corresponding to the management IP address, a number of takeovers 4044, and date and time of creation 4045. The takeover history table 404 relates to file servers 160 of the NAS system belonging to the local site 1, and information on a file server 160 which has been failed over from the local site 1 to the remote site 2 is removed from the takeover history table 404. Conversely, information on a file server 160 which is failed back from the remote site 2 to the local site 1 is added as an entry of the takeover history table 404. It should be noted that the date and time of takeover 4042 stores date and time when the failover process is carried out and a task is taken over.

The takeover history table 404 is updated by the takeover process 173 of the respective nodes and the local site monitoring process 374 of the remote site 2 described later.

The priority setting information 405 contains thresholds, parameters, and conditional expressions used to determine the priorities based on log information of the file servers 160 running on the NAS's 100 to 300.

For example, when the priority is determined according to the number of accesses per unit period of time of time in the same NAS system, if the number of accesses per unit period of time>AC1, the priority=A if AC2<the number of accesses per unit period of time≦AC1, the priority=B, and if the number of accesses per unit period of time≦AC2, the priority=C, and the priority is set for the respective file servers 160. It should noted that the thresholds AC1 and AC2 are predetermined, and AC1>AC2. A cumulative number of accesses may be used in place of the number of accesses per unit period of time.

Then, the remote site 2 is set as the failover destination for the priority A, a node of other NAS system in the same local site 1 is set as the failover destination for the priority B, and other LU in the same node or other node in the same NAS system is set as the failover destination for the priority C.

As described above, the priority setting information 405 is set in advance by the administrator from the management client 32 or the like.

Moreover, the predetermined thresholds and the conditional expressions may be set according to the number of the files, the capacity of the files, and the number of user accounts. Alternatively, the conditional expressions used to set the priorities may be properly set according to combinations of the number of accesses per unit period of time, the number of files, the capacity of files, and the number of user accounts. These thresholds and the conditional expressions may be properly set according to properties of the local site 1 and the user site 3.

<Processes in Local Site>

A detailed description will now be given of the failover process executed in the nodes of the local site 1 shown in FIG. 3.

A detailed description will now be given of the priority setting process for the file server 160 shown in the above section (2) and FIG. 3. This process is carried out at a predetermined cycle by the file server prioritizing process 171 constituting the failover module 170 of the respective nodes in the local site 1.

The priority setting process determines the priority of the file server 160 based on information, such as an access log to the file server 160, and prioritizing rules set by the system administrator, on the respective nodes of the local site 1, and writes the determined priority in the priority 4017 of the server information table 401.

On this occasion, the respective file servers 160 store an access log 1300 shown in FIG. 11 to an assigned LU or the like. In respective entries of the access log 1300 shown in FIG. 11 are stored date and time of access 1301, directory path information of an accessed file 1302, and user information (user ID) of the access 1303.

Figure 12:
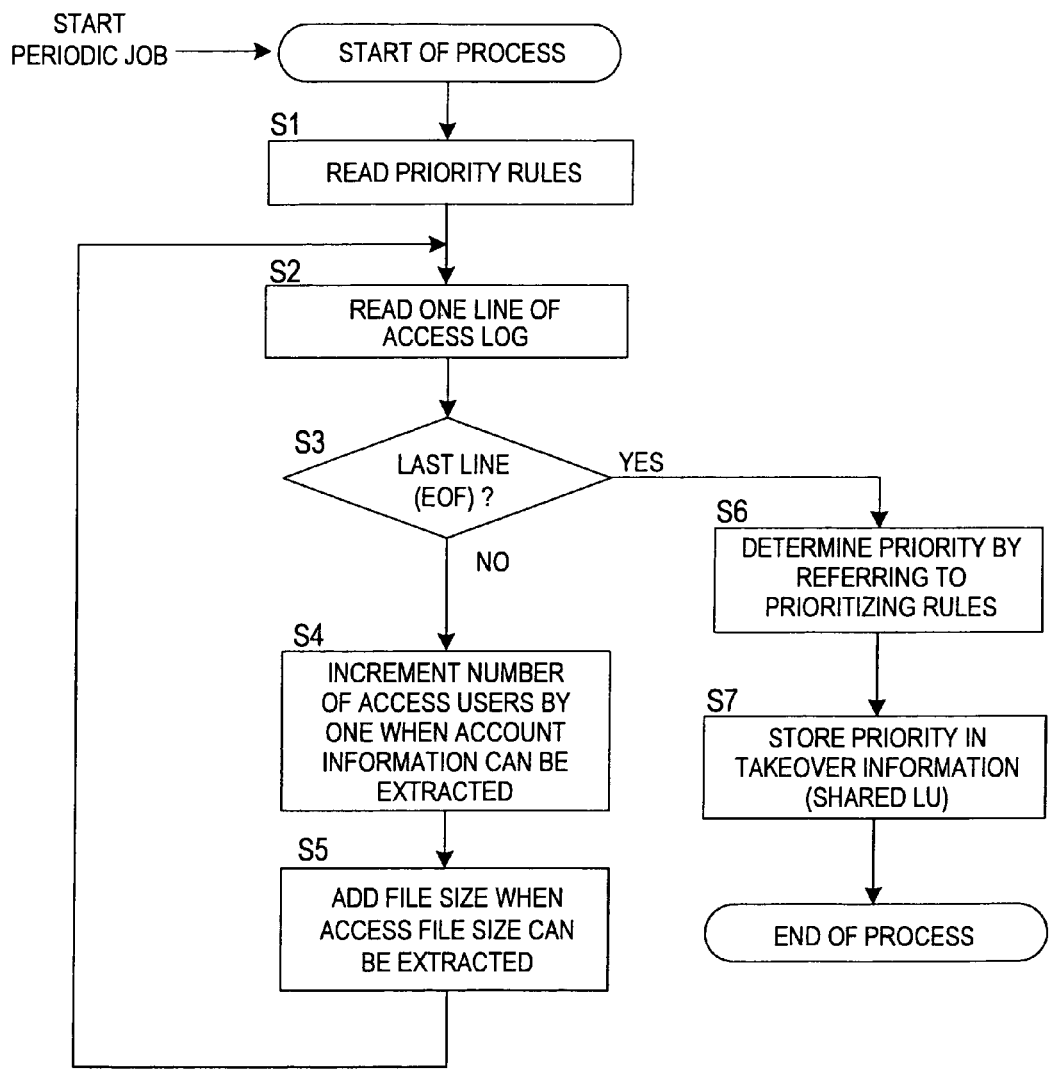
FIG. 12 is a flowchart showing an example of a file server prioritizing process executed in the respective nodes of the local site.

FIG. 12 shows an example of the process executed by the file server prioritizing process 171.

In a step S1, the file server prioritizing process 171 refers to takeover information 400 in a shared LU of an NAS system to which a node running the failover module 170 belongs, and reads priority setting information 405. On this occasion, a number of access users Nac as a variable is reset to 0, and a data size Vf1 is reset to 0. In a step S2, the file server prioritizing process 171 reads one line at the start of the access log 1300 created by a file server 160 of the node running the failover module 170. In a step S3, the file server prioritizing process 171 determines whether the presently read line of the access log 1300 is at the end of a file (EOF). When the end of the file has not been reached, the file server prioritizing process 171 proceeds to a step S4. When the end of the file has been reached, the file server prioritizing process 171 proceeds to a step S6.

In the step S4, when the account information can be extracted from the read line of the access log, the file server prioritizing process 171 adds one to the number of access users (NAC) as a variable. Then, the file server prioritizing process 171 obtains the size of an accessed file from the directory path information 1302, and the obtained file size is added to the file size Vf1 as a variable. Then, the file server prioritizing process 171 returns to the step S2, and reads the next line of the access log 1300.

In the step S6 after the end of the file has been reached, the file server prioritizing process 171 determines a priority by applying thresholds and conditional expressions read from the priority setting information 405 which has been read from the takeover information 400 of the shared LU, to the number of access users (NAC) indicating the total number of the users who have made access, and to the data size Vf1 indicating the total capacity of the files to which the accesses have been made.

For example, the thresholds and the conditional expressions of the priority setting information 405 applied to the above two values are:

Priority A: Number of access users>XX AND data size>YY,

Priority B: Number of access users>W AND data size>WW,

Priority C: Number of access users>TT AND data size>UU, and

Priority D: Other than above.

As a result of the above process, the priorities of the respective servers 160 are periodically updated, and thus, the priorities 4017 in the server information table 401 in the takeover information 400 of the shared LU are updated.

And a result of the above process, the priority of the respective file servers 160 is periodically determined according to the total number of the users who have made access, and the total capacity of the files to which the accesses have been made. The file server prioritizing process 171 periodically updates the priority 4017 of the server information table 401 of the takeover information 400 to the determined priority.

Namely, the priority increases as the utility of the file server 160, the number of the stored files, and the total capacity of the files increase.

<Details of Monitoring Process of File Server>

Figure 13:
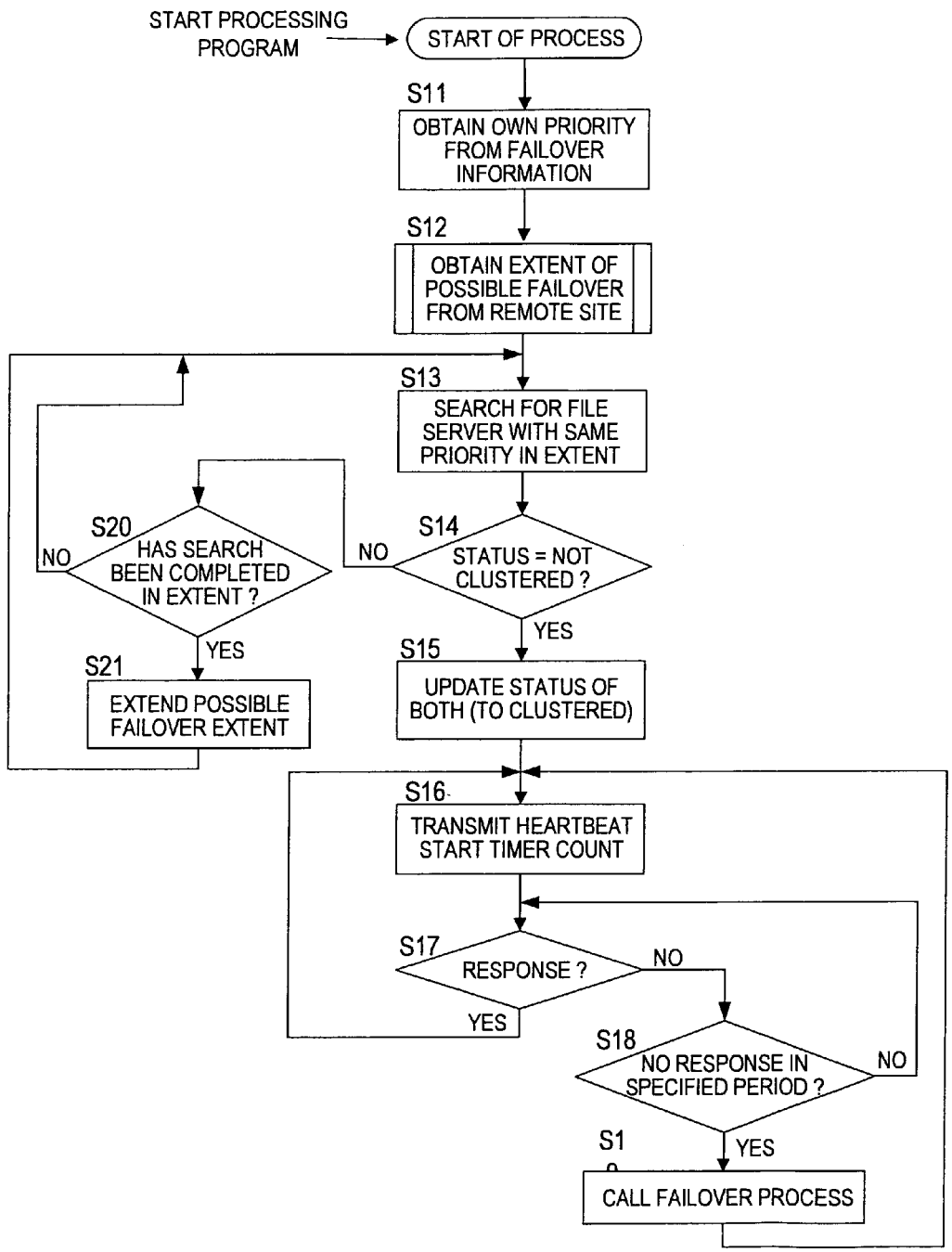
FIG. 13 is a flowchart showing an example of a process executed in a file server monitoring process in the respective nodes.

A detailed description will now be given of the monitoring process of the file server in the local site 1 of the monitoring process of the file server 160 described in the section (3). FIG. 13 is a flowchart showing an example of a process of the file server monitoring process 172 constituting the failover module 170 of the respective nodes of the local site 1. It should be noted that the file server monitoring process 172 is repeatedly executed on the background or the like while the failover module 170 is running.

In a step S11, the file server monitoring process 172 obtains the priority of a file server 160 on a node running the failover module 170 from a server information table 401 of a shared LU.

In a step S12, the file server monitoring process 172 inquires the remote site 2 to obtain a possible extent of the failover destination corresponding to the priority of the file server 160 of the node itself. Namely, the file server monitoring process 172 obtains any one of other LU in the same enclosure, other NAS system in the same local site 1, and the remote site 2. This process will be described later. A node (file server 160) in the remote site 2, which is the destination of the inquiry, inquires the server information table 401 in the takeover information 400 of the shared LU about file servers 160 in the remote site 2 whose cluster status 4015 is "Not Configured". When there is no file server 360 whose cluster status 4015 is "Not Clustered" in the remote site 2, an inquiry may be made to a node whose cluster status 4015 is not "In Failure".

In a step S13, the file server monitoring process 172 searches for a file server 160 which has the same priority as the file server 160 in the node itself and is in the obtained extent from the server information table 401 of the sheared LU. For this search, the file server monitoring process 172 refers to the server information table 401 from the takeover information 400 of the shared LU of other NAS system or the NAS system of the remote site 2.

Then, in a step S14, the file server monitoring process 172 refers to the cluster status 4015 of the file server 160 searched for in the step S13 to determine whether the cluster status 4015 is "Not Clustered" or not, thereby searching for a file server 160 which is to constitute a cluster.

When there is a file server 160 whose cluster status 4015 is "Not Clustered", the file server 160 is selected as a file server 160 of the failover destination. When the cluster status 4015 is "Clustered" or "In Failure", the file server monitoring process 172 proceeds to a step S20 to search for another file server 160.

After the file server 160 is selected, the file server monitoring process 172 proceeds to a step S15, and changes the cluster status 4015 of the searched file server 160 and the cluster status 4015 of the own file server 160 to "Clustered". Then, the file server monitoring process 172 sets the identifiers (the identifier of the NAS system and the identifier of the node) of the selected file server 160 to the failover destination RAID subsystem name 4018 of the own file server 160 of the server information table 401.

When the cluster status 4015 of the file server 160 is not "Not Clustered" in the step S14, the file server monitoring process 172 determines whether all file servers 160 in the extent with the same priority are searched in the step S20. When there remain file servers 160 in the extent with the same priority, the process returns to the step S13 to search for a next file server 160 in the extent of the present priority. On the other hand, when there has not been found a file server 160 whose cluster status 4015 is "Not Clustered" in all the file servers 160 in the extent with the same priority, the file server monitoring process 172 proceeds to a step S21. In the step S21, since there has not been found a file server 160 which can constitute a cluster in the extent with the present priority, the file server monitoring process 172 increases the priority by a certain amount. Alternatively, the definition of the destination of the failover corresponding the priority is extended. For example, the priority is increased by one level to extend the extent to search for a file server 160 which is to constitute a cluster. After the extension of the search extent, the file server monitoring process 172 returns to the step S13 to continue the search for a file server 160. Namely, if a failure occurs to the same NAS system when the priority is low, and all nodes enter the status of "In Failure", there may be no takeover destinations. To address this problem, the priority is increased to set again a priority which has a wider extent of the failover destination, thereby constituting a cluster.

In a step S16, the file server monitoring process 172 transmits a heartbeat to the node of the determined cluster (failover destination), and then starts a count by means of a timer to detect a failure. It should be noted that contents of the heartbeat can be realized by means of a desired protocol. Then, the NAS system running the file server 160 duplicates data (file system) by means of remote copy to the node of the failover destination in predetermined timing.

In a step S17, the file server monitoring process 172 determines the presence of a response to the transmitted heartbeat. When there is a response, the file server monitoring process 172 returns to the step S16, transmits the heartbeat again, and resets the count to start the count again. It should be noted that the repetition of the steps S16 and S17 can be carried out at transmission intervals of the heartbeat set in advance.

When there is not a response in the step S17, the file server monitoring process 172 proceeds to a step S18, and determines whether the count of the counter has exceeds a predetermined value. When the count is equal to or less than the predetermined value, the file server monitoring process 172 returns to the step S17. When there is no response after the count has exceeded the predetermined value, the file server monitoring process 172 determines that a failure has occurred to the other party of the cluster, and proceeds to a step S19. In the step S19, the file server monitoring process 172 calls and starts up the takeover process 173 to carry out the failover process.

As a result of the above process, the respective nodes in the local site 1 search for a file server 160 whose cluster status is "Not Clustered" in the extent of the failover destination according to the priority, and constructs a cluster by combining the searched file server 160 and the file server 160 of the node itself. The backup of data is carried out in predetermined timing between nodes in a cluster by means of the remote copy module of the NAS system. An occurrence of a failure is monitored by means of the mutual transmission of the heartbeat in the cluster, and if a failure occurs, a node of the takeover destination starts the takeover process 173.

Figure 14:
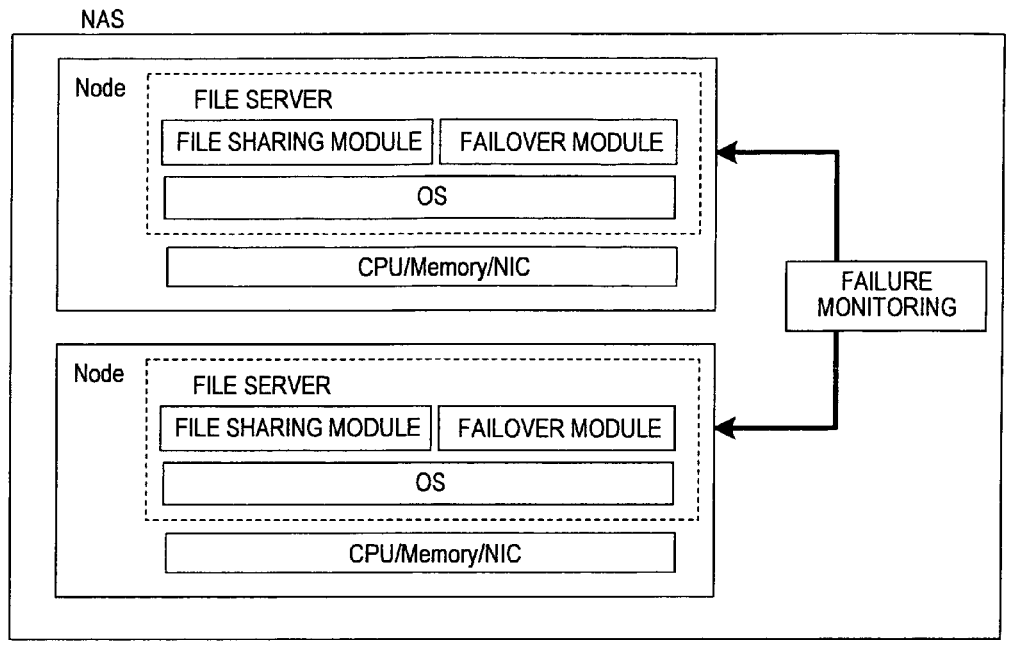
FIG. 14 is a block diagram showing an example of a failover in the same NAS system.

For the failure monitoring process of the file servers in the nodes in the local site 1, a node itself and other node in an NAS system in the same enclosure constitute a cluster when the priority is low as shown in FIG. 14, for example. The failover modules 170 of both of them mutually monitor a state of failure generation. If a failure occurs to the node providing a service to the management clients 32, a file server 160 of the failover destination obtains the takeover information 400 from the shared LU to carry out the failover.

Figure 15:
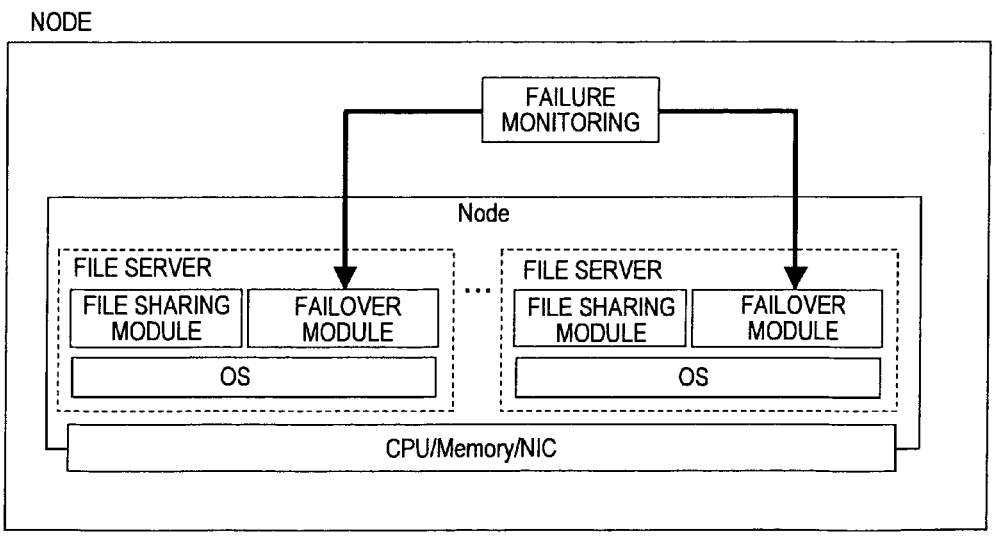
FIG. 15 is a block diagram showing an example of a failover in the same node.

In a virtual NAS system (described later) which provides multiple file servers 160 in one node as shown in FIG. 15, the file servers 160 in the same node can constitute a cluster to monitor an occurrence of a failure. Then, if a failure occurs, a takeover is carried out in the same node.

Figure 16:
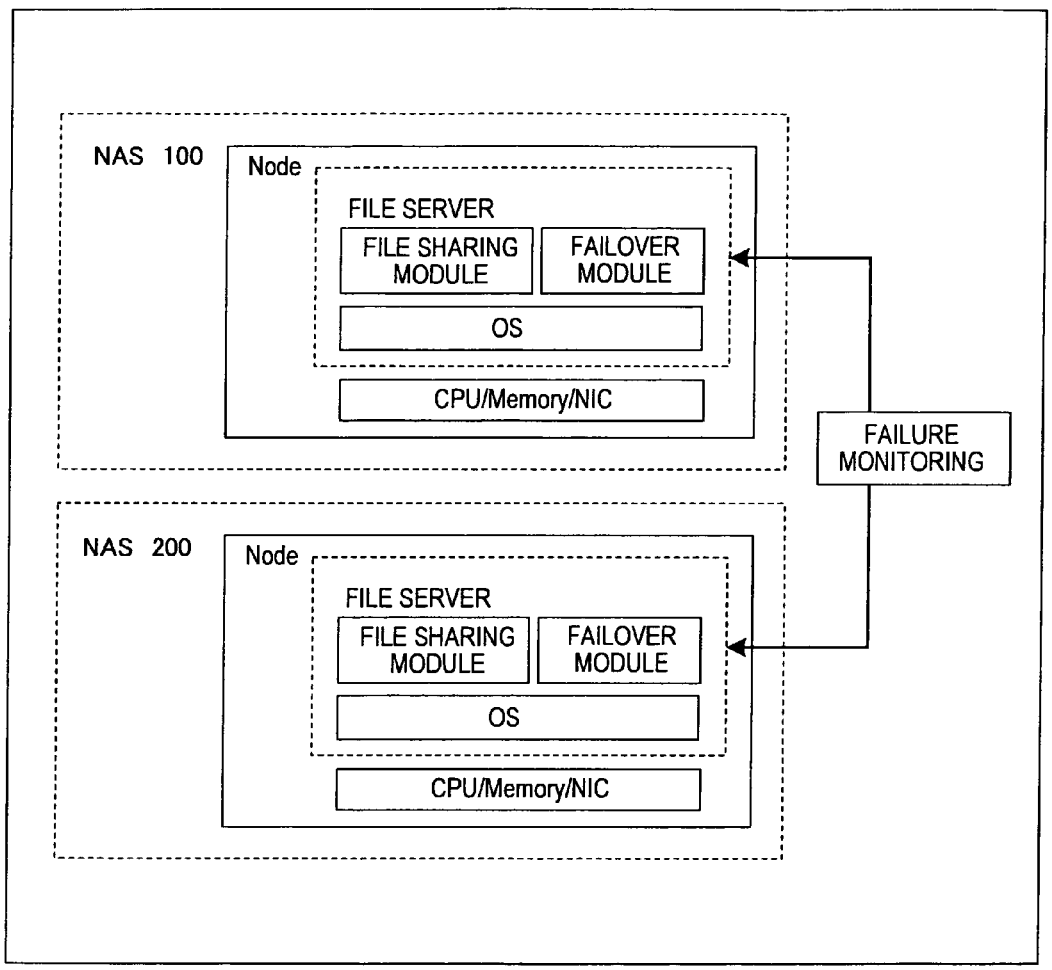
FIG. 16 is a block diagram showing an example of a failover to other NAS system in the same local site.

On the other hand, as the priority increases, it is possible to carry out a failover to other NAS system in the same local site 1. For example, as shown in FIG. 16, a node of the NAS 100 and a node of the NAS 200 constitute a cluster, and mutually monitor an occurrence of a failure. On a failure, the node of the NAS 200 takes over the node of the NAS 100, and provides the user site 3 with a file server 160.

In this way, for the respective nodes, a file server 160 which has the same priority, and whose cluster status is "Not Clustered" is found based on the takeover information 400 of the file server 160, and the status in the takeover information is changed to "Clustered", and the failure monitoring (heartbeat monitoring) starts. The other party of the cluster is a file server 160 or 360 in the same node, in the same site (local site), or in the remote site 2 according to the priority of the file server 160. If a failure is detected after the failure monitoring starts, the takeover process described later is executed.

<Details of Failover Process>

Figure 17:
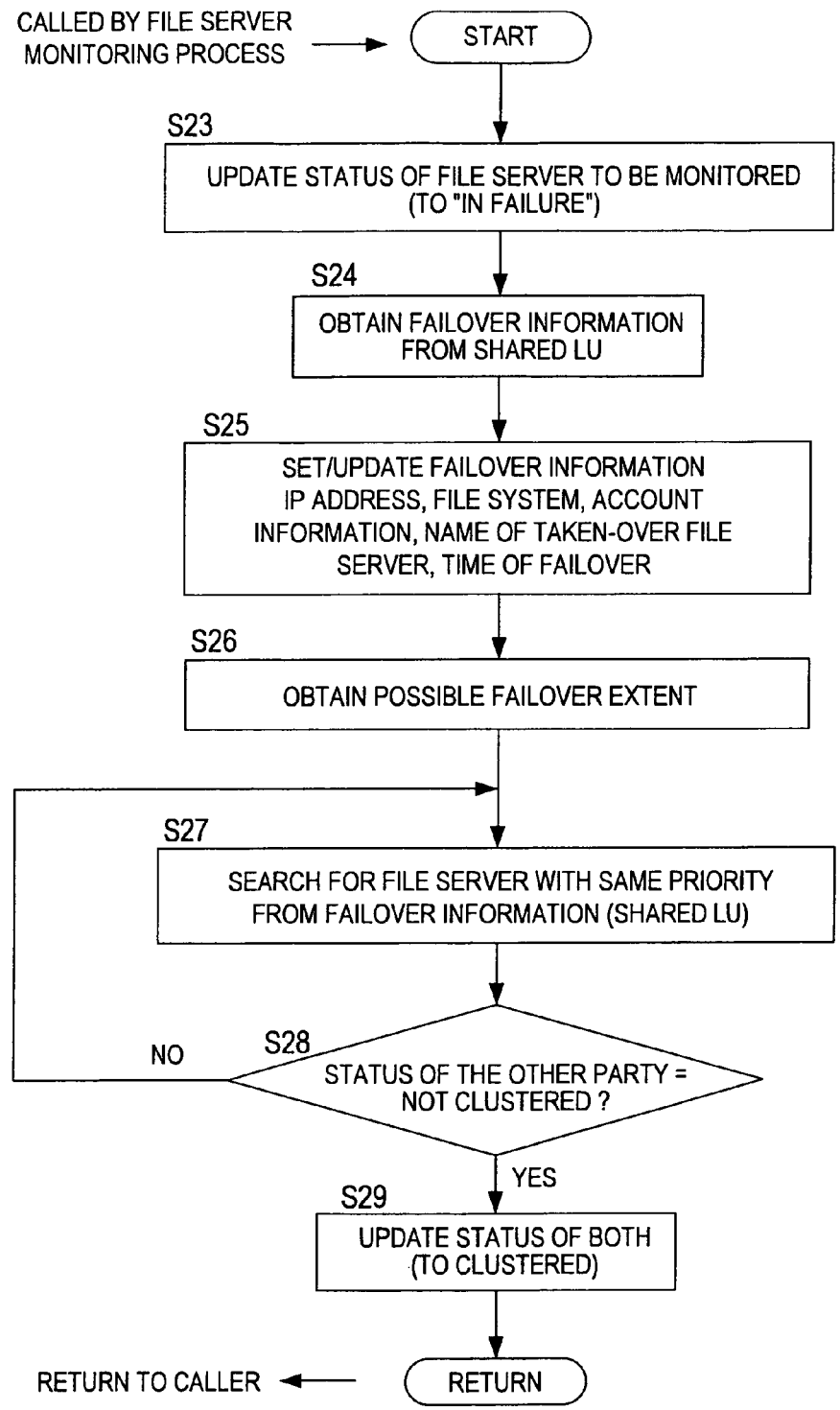
FIG. 17 is a flowchart showing an example of a takeover process executed in the respective nodes.

Referring to a flowchart in FIG. 17, a description will now be given of the takeover process 173 called in the step S19 in FIG. 13. This process is called from the file server monitoring process 172 in the node of the local site 1.

The failover process is executed by the takeover process 173 running on the node of the takeover destination.

In a step S23, the takeover process 173 first reads the server information table 401 of the shared LU to which the file server 160 to be monitored belongs, and updates the cluster statues 4015 of the file server 160 to which the failure has occurred to "In Failure".

In a step S24, in order to take over resources of the file server 160 to which the failure has occurred, the takeover process 173 obtains the file server name 4011, the management IP address 4014, the number of service IP addresses 4016, and the priority 4017 of the file server 160 to be monitored from the server information table 401 of the takeover information 400 of the shared LU. Moreover, the takeover process 173 obtains resources such as the service IP table 402 and the user information table 403 of the file server 160 to which the failure has occurred.

In a step S25, the takeover process 173 updates the setting of the file server 160 which is the takeover destination using the obtained resources. Namely, the takeover process 173 sets the obtained file server name 4011, management IP address 4014, number of service IP addresses 4016, and priority 4017 to the server information table 401 of the file server 160 of the takeover destination. Moreover, the service IP table 402 and the user information table 403 are set to the shared LU of the NAS system to which the own file server 160 belongs. Then, the task of the file server 160 is resumed.

Then, the takeover process 173 writes the management IP address 4041 of the file server 160 which has been taken over, the date and time of the takeover 4042, and the MAC address 4043 of the node which has been taken over, in the takeover history table 404.

The failover process has been completed through the steps S23 to S25, and a cluster is reconstructed subsequently to a step S26.

In the step S26, in order to reconstruct the cluster, the takeover process 173 inquires the remote site 2 about the priority of the file server 160 of the own node, and obtains an extent available for the failover corresponding to the priority of the file server 160 of the own node. Namely, the takeover process 173 obtains any one of other LU in the same enclosure, other NAS system in the same local site 1, and the remote site 2. This process will be detailed later. A node (file server 160) in the remote site 2, which is the destination of the inquiry, inquires the server information table 401 in the takeover information 400 of the shared LU about file servers 160 in the remote site 2 whose cluster status 4015 is "Not Clustered". When there is no file server 360 whose cluster status 4015 is "Not Clustered" in the remote site 2, an inquiry may be made to a node whose cluster status 4015 is not "In Failure".

In a step S27, the takeover process 173 searches for a file server 160 with the same priority from the server information table 401 of the takeover information 400. Then, the takeover process 173 determines whether the cluster status 4015 of the file server 160 searched for in the step S28 is "Not Clustered" or not. When the cluster status 4015 is "Not Clustered", the takeover process 173 selects the file server 160 as a file server to constitute the cluster, and proceeds to a step S29. In the step S29, the cluster statuses 4015 of the own file server 160 and the searched file server 160 are set to "Clustered". Then, the takeover process 173 writes the node, the identifier of the LU, and the like of the selected file server 160 in the failover destination RAID subsystem name 4018 of the server information table 401 of the own file server 160, and is completed, and the procedure returns to the process shown in FIG. 13.

On the other hand, when the cluster status of the file server 160 searched in the step S28 is "Not Clustered", the takeover process 173 returns to the step S27 and carries out the search again.

As a result of the process above, when a failure occurs to the cluster, the node of the takeover destination obtains the resource information from the takeover information 400 of the shared LU, and resumes the file server 160. Then, a file server 160 with the same priority is searched for, and a new cluster is constituted.

As described above, the failover destination is restricted by the priority 4017, and mapping is carried out as described below, for example:
Priority A->Remote site,
Priority B->Local site, and
Priority C->Same NAS.

With this restriction, a file server is searched for, and a cluster is reconstructed.

<File Server Monitoring Responding Process>

Figure 18:
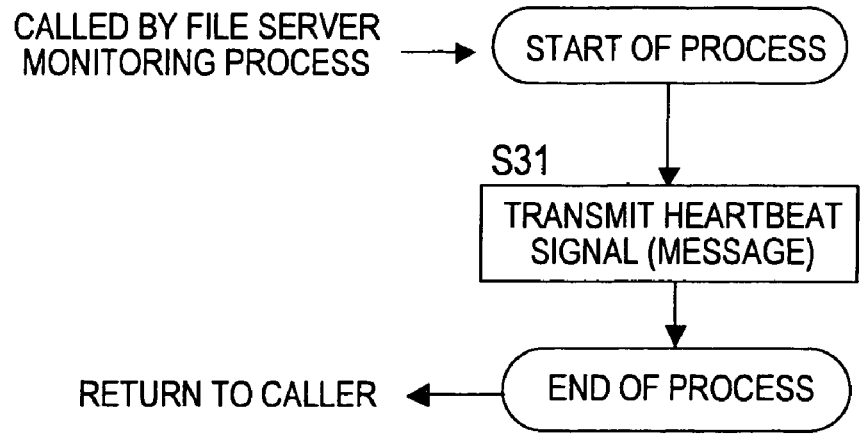
FIG. 18 is a flowchart showing an example of a file server monitoring responding process executed in the respective nodes.

Referring to a flowchart in FIG. 18, a description will now be given of the file server monitoring responding process 174 shown in FIG. 3. FIG. 18 shows the file server monitoring responding process 174 executed on a file server 160 to be monitored. This process is executed each time the file server 160 to be monitored receives a heartbeat from a node of the failover destination. When the file server 160 to be monitored receives a heartbeat from the node of the failover destination, the file server 160 returns a heartbeat (message) to the node of the failover destination (S31). As a result, the node of the failover destination can recognize that the file server 160 to be monitored is operating. On the other hand, if a failure occurs to the node, the response by means of the heartbeat becomes impossible, and the node of the failover destination thus can detect the generation of the failure.

<Shutdown Request Receiving Process>

Figure 19:
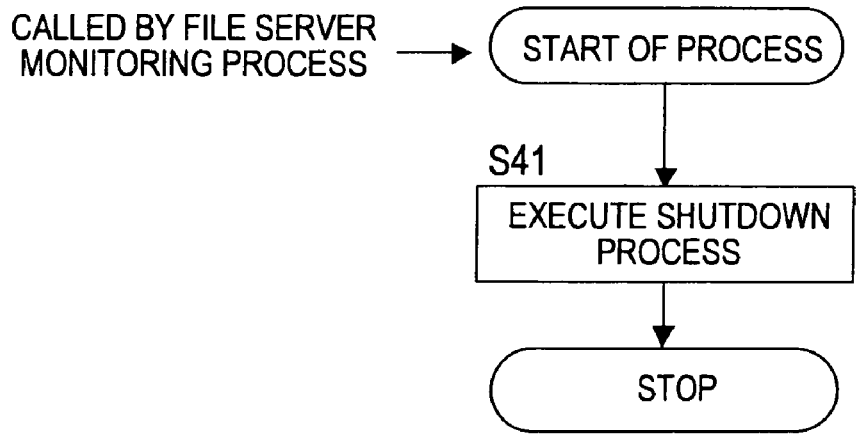
FIG. 19 is a flowchart showing an example of a shutdown receiving process executed in the respective nodes of the local site.

Referring to a flowchart in FIG. 19, a description will now be given of the shutdown request receiving process 175 shown in FIG. 3. FIG. 19 shows the process executed when a file server 160 to be monitored receives a shutdown request from other node.

When the file server 160 to be monitored receives a shutdown request from the node of the failover destination, the file server 160 executes the shutdown process for the node thereof, and stops (S41).

As a result, the node of the failover destination can stop the file server 160 to be monitored to which the failure has occurred.

<Processes in Remote Site>

A detailed description will now be given of respective processes executed in the remote site 2. As shown in FIG. 4, the nodes 3-0 to 3-n of the remote site 2 execute the failover module 370.

The processes of the failover module 370 other than the local site monitoring process 374 and the failover destination controlling process 375 are the same as the file server monitoring process 172 and other processes executed in the nodes of the local site 1. Namely, in the failover module 370 of the remote site 2, the file server monitoring process 371 is the same as the file server monitoring process 172 of the local site 1, the takeover process 372 is the same as the takeover process 173 of the local site 1, and the file server monitoring responding process 373 is the same as the file server monitoring responding process 174 of the local site 1.

In the following section, a description of the processes same as those of the nodes in the local site 1 is omitted, and a description will given of the local site monitoring process 374 and the failover destination controlling process 375, which are different from processes executed on the nodes of the local site 1.

Since the respective nodes of the remote site 2 function as a backup site (secondary site) of the local site 1, they do not have the file server prioritizing process 171 and the shutdown request receiving process 175 which are executed on the nodes of the local site 1.

<Local Site Monitoring Process>

Figure 20:
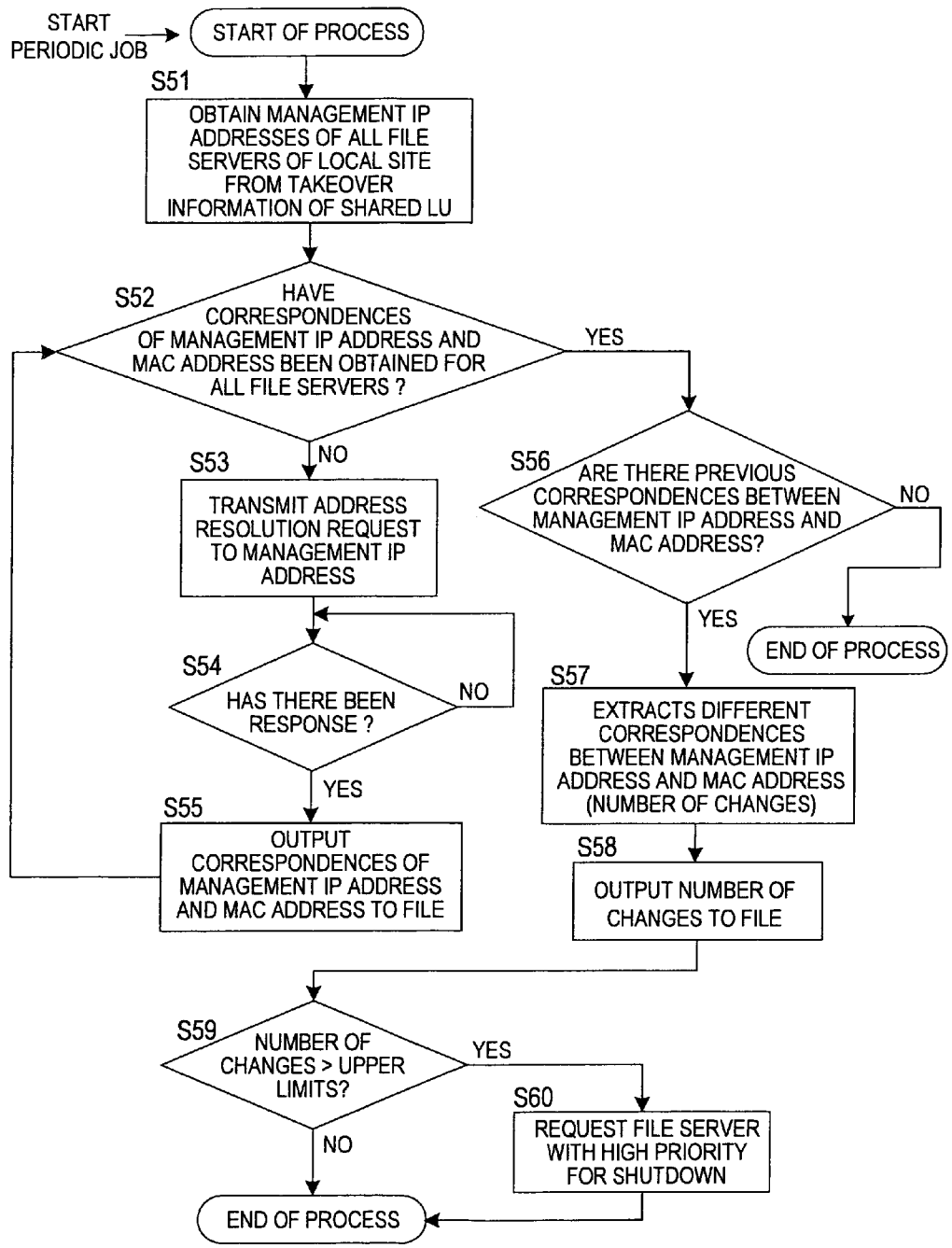
FIG. 20 is a flowchart showing an example of a local site monitoring process executed in the respective nodes of the local site.

FIG. 20 is a flowchart showing an example of the local site monitoring process 374 executed in the respective nodes 3-0 to 3-*n* of the remote site 2. This process is executed at predetermined intervals in the respective nodes 3-0 to 3-*n*.

The local site monitoring process 374 monitors file servers 160 running in the local site 1, and monitors whether failures are widely occurring to the file servers 160 in the local site 1. If failures are frequently occurring to the file servers 160 in the local site 1, a file server 160 with a high priority in the local site 1 is failed over to the remote site 2 to secure data thereof even if failures are not occurring to the file server 160 itself but occurring in a neighborhood thereof.

The local site monitoring process 374 first obtains the management IP addresses of all the file servers 160 in the local site 1 from the takeover information 400-3 of the shared LU 330S in a step S51. Subsequently to a step S52, the local site monitoring process 374 obtains a correspondence between the management IP address and the MAC address of the file servers 160 in the local site 1. Thus, in the step S52, the local site monitoring process 374 determines whether the correspondence between the management IP address and the MAC address are acquired for all the file servers 160 in the local site 1, and proceeds to a step S56 if the acquisition has been completed, or proceeds to a step S53 otherwise.

In steps S53 and S54, the local site monitoring process 374 applies the Address Resolution Protocol (ARP) to the management IP address in the local site 1 to obtain the MAC address. The MAC address is an MAC address of the network interface 14 of the node on which the file server 160 is running.

In a step S55, the obtained correspondence between the management IP address and the MAC address is written to a takeover history table 404. On this occasion, to the takeover history table 404 shown in FIG. 10 is added a record of the management IP address 4041, and the MAC address 4043 and the date and time of creation 4045 are stored therein.

Then, the local site monitoring process 374 returns to the step S52, and determines whether an MAC address has been obtained for all the management IP addresses. The process in the steps S52 to S55 is repeated, and consequently, the correspondence between the management IP address and the MAC address is recorded in the takeover history table 404 for all the file servers 160 in the local site 1.

When all the correspondences between the management IP address and the MAC address are stored, the local site monitoring process 374 proceeds to a step S56, and determines whether there already exist records of a management IP address which has been generated this time, for the respective management IP addresses in the takeover history table 404. When there are records whose management IP address is the same, and whose MAC address is different in the takeover table 404, the local site monitoring process 374 proceeds to a step S57. On the other hand, when the correspondence between the management IP address and the MAC address which has been presently written coincides with the previous correspondence between the management IP address and the MAC address, or when there is no management IP address which is the same as the management IP address presently written, the local site monitoring process 374 ends.

Namely, the local site monitoring process 374 sorts the takeover history table 404 with respect to the management IP address 4041, then sorts with respect to the date and time of creation, determines whether the present MAC address is different from the previous MAC address for the respective management IP addresses, and determines that the MAC address has been changed as a result of the failover process when the MAC address is different from the previous MAC address. Moreover, when there are no management IP addresses 4041 same as the management IP address of the presently created record, the local site monitoring process 374 determines that the file server 160 has been newly added.

When there are management IP addresses whose MAC address has been changed, the local site monitoring process 374 extracts the number of the MAC addresses corresponding respectively to these management IP addresses in the step S57. Namely, the local site monitoring process 374 extracts different correspondences of the MAC addresses to the respective management IP addresses, and counts the numbers thereof (numbers of the change in the MAC addresses). Then, the local site monitoring process 374 outputs the sum of the counted numbers of failovers for the respective management IP addresses in a step S58. The output of the number of failovers is set to the number of takeovers 4044 of a record with the latest date and time of creation 4045 of the corresponding management IP addresses 4041 in the takeover history table 404.

In a step S59, the local site monitoring process 374 determines whether the number of changes of the MAC address exceeds an upper limit set in advance. When it is determined that the number of the changes exceeds the upper limit, the local site monitoring process 374 proceeds to a step S60, and carries out a failover for a file server 160 with the high priority in advance. In the determination in the step S59, when the condition: the number of changes>the upper limit holds for any one of the management IP addresses extracted in the step S57, the local site monitoring process 374 executes the process in the step S60.

In the step S60, to fail over a file server 160 with a high priority in advance, a file server 160 with the high priority in the local site 1 is selected from the server information table 401 of the shared LU 330S. For example, a file server 160 with the priority A is selected. Then, a shutdown is requested to the selected file server 160. The file server 160 which has received the request executes the shutdown according to the process of FIG. 19. Since a response to a heartbeat will stop due to the shutdown, a file server 160 constituting a cluster is to take over the file server 160 which is shut down.

As described above, if a failover of a file server 160 occurs in the local site 1, the IP addresses (management IP address and service IP address) of the file server 160 to which a failure has occurred are taken over to other file server 160. As a result, since the hardware (node) changes before and after the failure while the IP addresses remain the same, the MAC address of the network interface 14 changes. It is possible to count the number of failovers which have occurred in the local site 1 by periodically monitoring the correspondence between the IP address and the MAC address of the file server 160, and considering the number of changes of the correspondence=the number of occurrences of failovers. The correspondence between an IP address and an MAC address can be determined by obtaining the MAC address corresponding to the IP address by means of an address resolution protocol such as the ARP. The number of observed failovers and the predetermined upper limit are compared with each other. When the number exceeds the upper limit, an instruction of a shutdown is issued to a file server 160 (priority A) which is in the remote site 2 and is an opposite party of the cluster, resulting in discontinuity of the heartbeat. As a result, it is possible to carry out a failover for the file server 160 with a high priority by shutting down the file server 160 when failovers frequently occur in the local site 1.

Since the file server 160 with a management IP address to which the shutdown has been instructed will be failed over to the remote site 2, a record corresponding to the management IP address thereof is removed from the takeover history table 404. As a result, it is possible to prevent the local site monitoring process 374 to be executed next time from carrying out a failover again for the file server 160 corresponding to the management IP address for which the failover has been carried out.

Moreover, the correspondence between a management IP address and an MAC address may be stored in the takeover history table 404 for a limited period of time specified in advance, and the record of the management IP address and the MAC address may be removed after elapse of the predetermined period of time in a process of the step S55, for example. In this case, if failovers frequently occur in the predetermined period (ten minutes, for example), a disaster is highly possibly occurring in the local site 1. In this case, tasks may be quickly recovered by carrying out a failover for file servers 160 with high priorities in advance.

Though there is described the example in which the management IP addresses and the MAC addresses are chronologically compared, the detection of the failovers is not limited to this example, and the failovers may be detected by chronologically comparing identifiers of tasks (file servers) which are to be taken over, with physical identifiers of nodes which provide the tasks which have been taken over. For example, names of file servers and MAC addresses may be chronologically compared.

Figure 21:
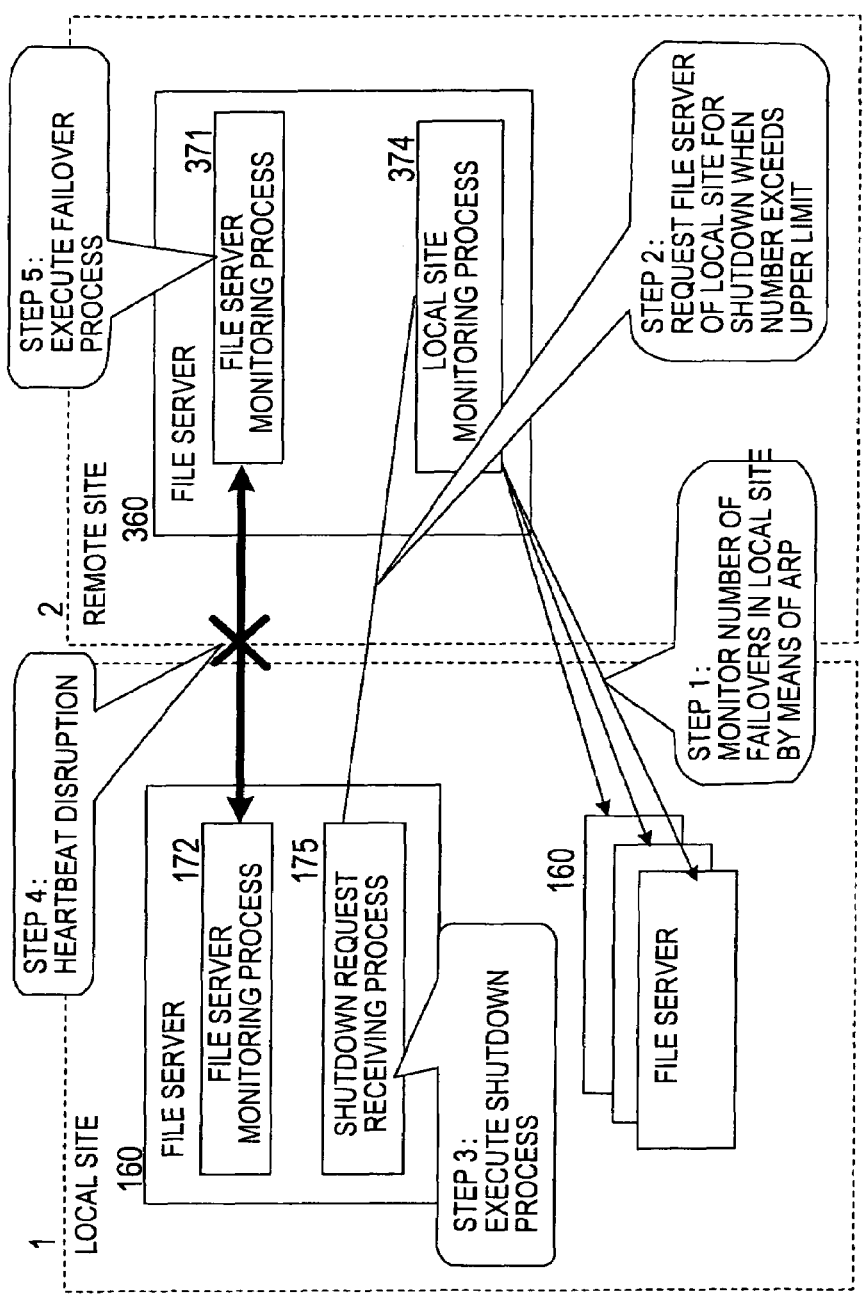
FIG. 21 is a block diagram showing an example of a failover of a file server with a high priority in advance on a frequent occurrence of failovers in the local site.

FIG. 21 describes steps carried out by the local site monitoring process 374 to carry out a failover for a file server 160 with a high priority in advance.

First, the local site monitoring process 374 of a file server 360 of the remote site 2 obtains the number of failovers according to the correspondences between the management IP address and the MAC address in the local site 1 by means of the ARP. Then, when the number of failovers in the local site 1 exceeds the predetermined upper limit, the local site monitoring process 374 transmits a shutdown request to a file server 160 with a high priority in the local site 1.

The file server 160 of the local site 1 which has received the shutdown request shuts down itself by means of the shutdown request receiving process 172. As a result, the file server 160 stops in the local site 1, the heartbeat thus stops, and the file server monitoring process 371 executes the takeover process in a node of the remote site 2 which constitutes a cluster along with the file server 160 with the high priority.

In this way, a failover is carried out before an occurrence of a failure by intentionally stopping the file server 160 with the high priority according to the frequency of failovers in the local site 1.

Though the file server 160 with the high priority is failed over when the number of changes of the MAC address exceeds the predetermined upper limit in the steps S59 and S60, a file server 160 with a high priority may be failed over when the number of changes of the MAC address exceeds the upper limit, and the number of file servers 160 which have been failed over exceeds a predetermined number.

Moreover, the local site monitoring process 374 may be carried out only by nodes whose cluster status 4015 is set to "Not Clustered" among the nodes 3-0 to 3-n of the remote site 2. As a result, it is possible to decrease loads on nodes which are clustered. Alternatively, one of the nodes 3-0 to 3-n of the remote site 2 may execute the local site monitoring process 374, and the other nodes thereof may suspend the local site monitoring process 374.

<Failover Destination Controlling Process>

Figure 22:
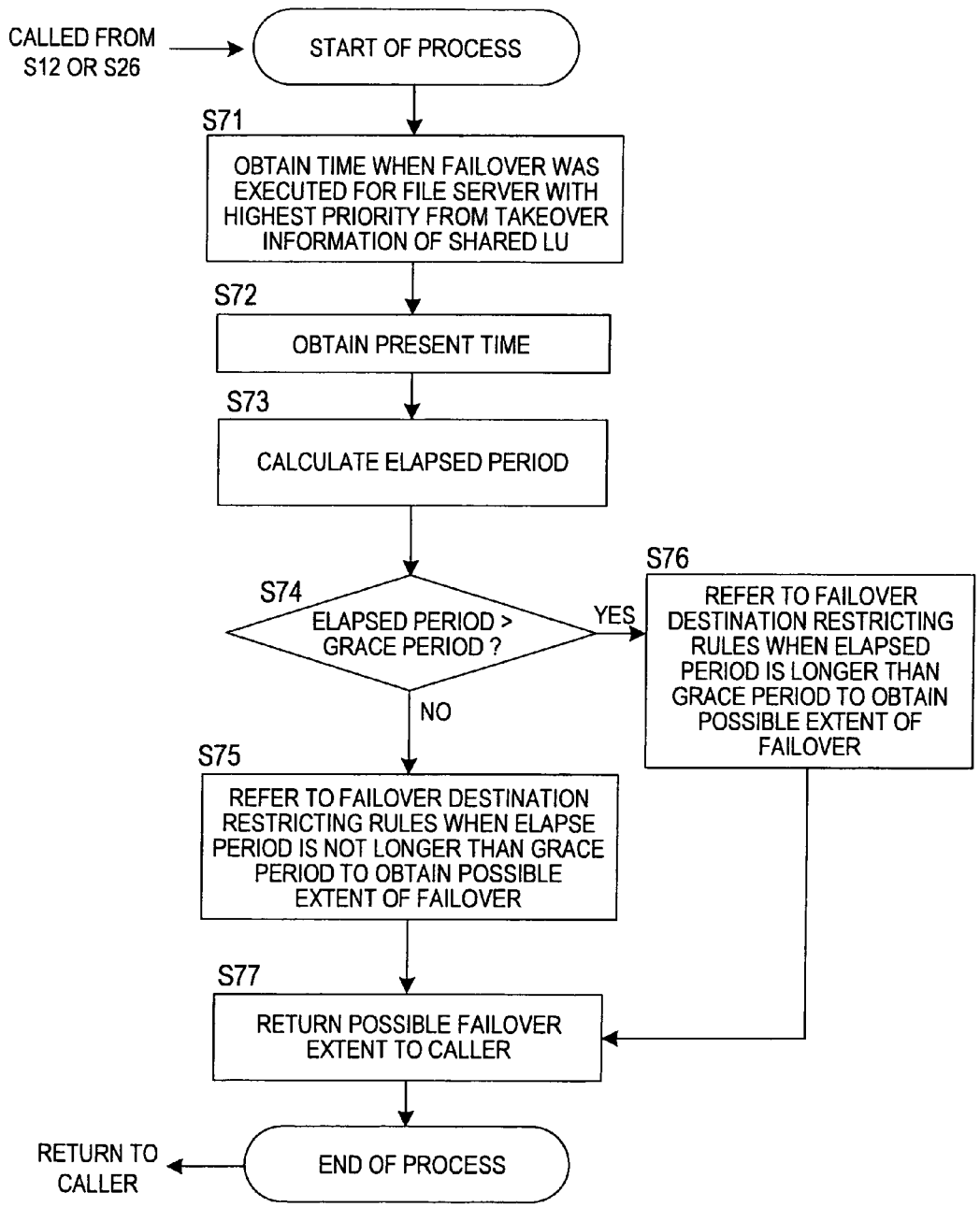
FIG. 22 is a flowchart showing an example of a failover destination controlling process executed in the respective nodes of the local site.

FIG. 22 is a flowchart showing an example of the failover destination controlling process 375 executed in the respective nodes 3-0 to 3-n of the remote site 2. This process is called from the file server prioritizing process 171 (S12 in FIG. 13) or the takeover process 173 (S26 in FIG. 17) which are executed by a node in the local site 1.

This process is called by the takeover process to determine a failover destination for a failover of a file server 160 in the local site 1. This process returns an extent available for the failover to the caller. The file server 160 in the local site 1 searches for a file server 160 in the returned extent, and forms a cluster. Moreover, according to the status (elapse of a grace period for a prioritized use, for example) of the remote site 2, the extent of the failover destination is changed through an adjustment of the priority, thereby permitting a file server 160 with a low priority to be failed over to the remote site 2.

A failover destination of a file server 160 with a low priority is restricted to a node in the same enclosure or in the local site 1. As a result, while a file server 160 with a high priority is taken over to the remote site 2 in a case of a disaster, a file server 160 with a low priority is not taken over. To address this problem, the failover destination controlling process 375 flexibly changes the priority used to take over a file server 160 of the local site 1 to the remote site 2 by sequentially carrying out failovers for file servers 160 with low priorities to the remote server 2 after a file server 160 with a high priority has been failed over to the remote site 2.

In a step S71, the failover destination controlling process 375 first refers to the takeover history table 404 of the takeover information 400 of the shared LU 330S to obtain the date and time of the last failover (namely, the time of the latest failover).

Then, the failover destination controlling process 375 obtains the present time in a step S72, and calculates an elapsed period from the start of the last failover to the present time in a step S73.

Then, in a step S74, the failover destination controlling process 375 determines whether the obtained elapsed period exceeds a predetermined grace period. When the elapsed period exceeds the grace period, the failover destination controlling process 375 proceeds to a step S76, or proceeds to a step S75 otherwise. The grace period is a period after which a file server 160 with a low priority starts a failover to the remote site 2 in consideration of a period required for a file server 160 with a high priority to complete a failover to the remote site 2. This grace period is set to the priority setting information 400 in advance by the administrator or the like from the management client computer 32 or the like.

In the step S75, since the elapsed period is less than the grace period, the priority is not reset (changed), and the failover destination controlling process 375 notifies the caller of the relationship between the priority and the failover destination set in advance, and finishes. An example of the rules when the elapsed period is less than the grace period is shown below.

Priority A->Remote site
Priority B->Local site
Priority C->Same RAID disk subsystem 130 (or same NAS system)

In the step S76, since the elapsed period exceeds the grace period, and the file servers 160 with high priorities have been failed over, the failover destination controlling process 375 extends the extent of the failover destinations for the file servers 160 with low priorities, notifies the caller of the correspondences between the priority and the failover destination, and ends. An example of the rules when the elapsed period exceeds the grace period is shown below.

Priorities A, B->Remote site
Priority C->Local site

In this way, data is secured by extending the failover destinations according to the priorities after the elapse of the grace period.

Though there are defined the two sets of the correspondences between the priorities and failover destinations while the grace period is considered as a threshold, grace periods different in value may be set as multiple thresholds, and there may be defined multiple sets of correspondences between the priorities and failover destinations.

As a result of the above process, after file servers 160 with high priorities have been failed over, failover destinations are extended, and file servers 160 with low priorities can be failed over. Thus, nodes with high priorities are first taken over to the remote site 2, and important data and the like are thus recovered quickly. Then, the failover destinations for the file servers 160 with low priorities are extended, thereby smoothly carrying out the failover when a disaster or a failure occurs to the local site 1.

<Conclusion>

As described above, according to the first embodiment, it is possible to reduce an adverse effect such as a delay in a recovery of file servers 160 with high priorities by preventing the file servers 160 with the high priorities and file servers 160 with low priorities from staring failover almost at the same time.

It is possible to reduce an adverse effect such as the delay in the recovery of file servers 160 with the high priorities by carrying out failovers for the file servers 160 with the high priorities to the remote site 2 before a failure occurs (when a failure occurs in the neighborhood), and carrying out failovers for the file servers 160 with the low priorities after the failure occurred, thereby generating a time difference.

Second Embodiment

Figure 23:
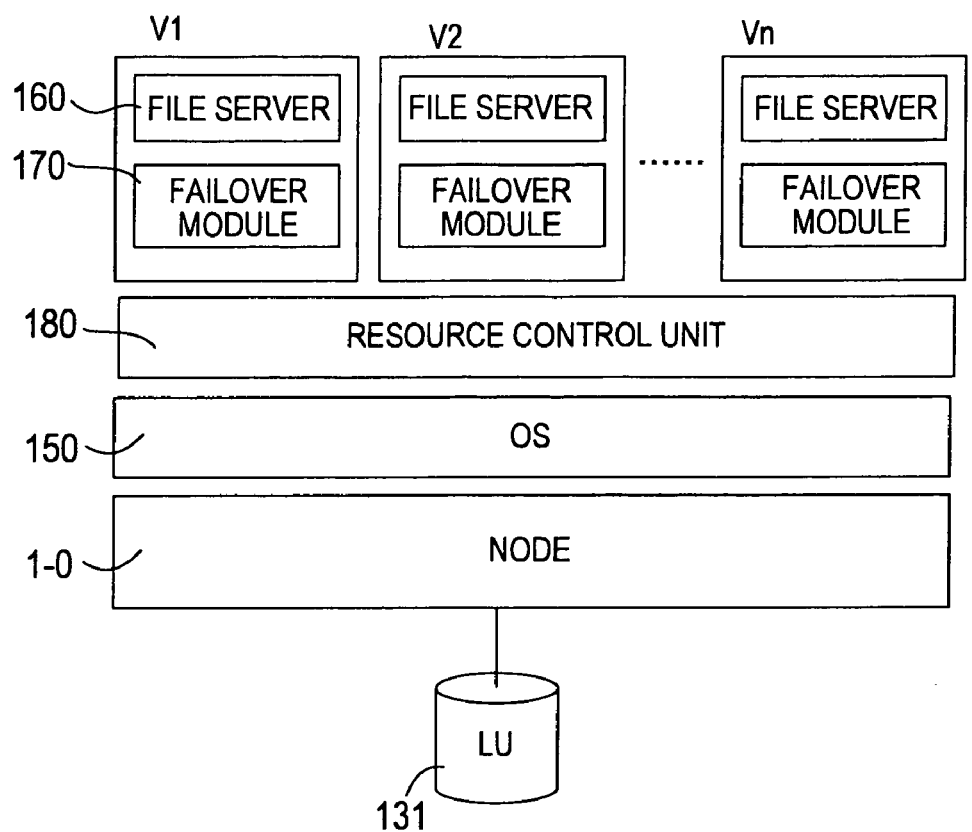
FIG. 23 shows a second embodiment, and is a block diagram showing an example of a virtual NAS system.

FIG. 23 shows a second embodiment which employs a Virtual NAS system (VNAS: Virtual Network Attached Storage) as the node 1-0 according to the first embodiment, and other configuration is the same as that of the first embodiment.

In FIG. 23, in the node 1-0 is running a resource controller 180 on the OS 150, and the resource controller 180 logically divides hardware of the node 1-0. Then, the resource controller 180 assigns areas obtained by logically dividing the LU 131, to respective divided partitions V1 to V*n*, and provides the respective partitions V1 to V*n* with root directories. In the respective partitions V1 to V*n* are executed the file server 160 and the failover module 170, which function as in the first embodiment. Moreover, the respective partitions V1 to V*n* are connected to different network interfaces.

Even when the one node 1-0 is divided into the multiple logical partitions V1 to V*n*, the file servers 160 on the respective partitions V1 to V*n* can be treated as in the first embodiment.

As the virtual NAS system, in addition to the above system, there may be employed any system which divides the node 1-0 into multiple logical partitions, and causes the file servers 160 to run in the respective logical partitions. For example, there may be applied a virtual computer (U.S. Pat. No. 6,397, 242) which runs one host OS on one server, runs multiple guest OS's on the host OS, and causes the respective guest OS's to serve as servers.

Moreover, there may be applied a virtual computer (JP 2002-304364 A) which divides a physical computer into multiple logical partitions by means of a firmware (or middleware) such as a hypervisor, and assigns computer resources (CPU, main memory, and I/O) to respective LPAR's, and causes OS's to run on the respective LAPR's.

Third Embodiment

Figure 24:
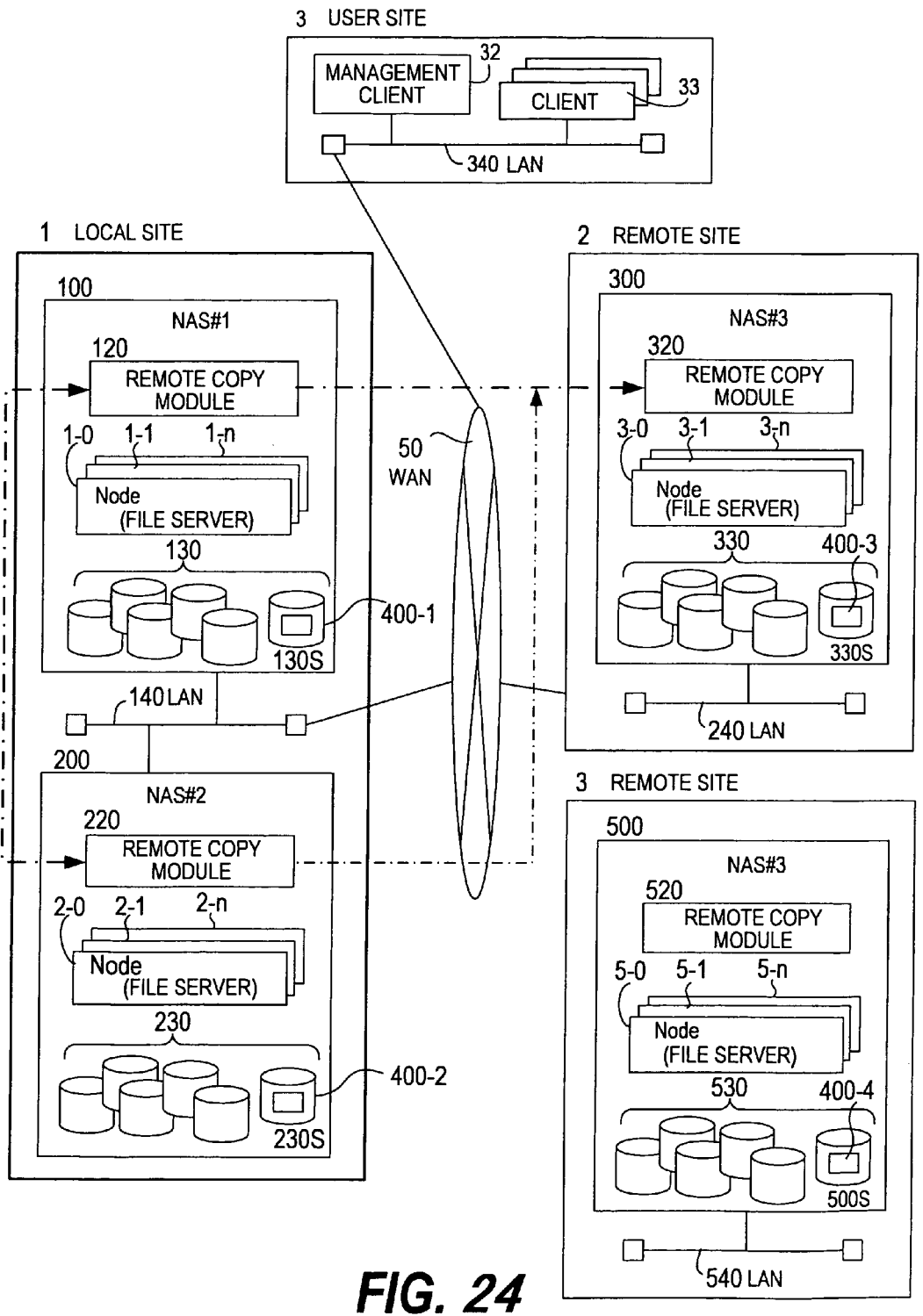
FIG. 24 shows a third embodiment, and is a block diagram showing a configuration of an overall system.

FIG. 24 shows a third embodiment in which a second remote site 3 is added to the first embodiment, and other configuration is the same as that of the first embodiment.

The remote site 3 is configured as in the respective sites, includes multiple nodes 5-0 to 5-*n*, a RAID disk subsystem 530, a shared disk 500S, and a remote copy module 520, and is connected to the WAN 50.

The first remote site 2 functions as in the first embodiment, and the second remote site 3 can execute the takeover in place of the first remote site 2. The first remote site 2 executes the file server monitoring process shown in FIG. 13, for example, and calls (requests for) the takeover process of other remote site (the second remote site 3, for example) according to the load thereon on calling the takeover process (S19), thereby sharing/distributing multiple monitoring processes and takeover processes running on the first remote site 2 with/to the second remote site 3. As a result, the respective remote sites 2 and 3 can monitor changes in MAC addresses, and fail over subject file servers 160 to the remote site 2 or 3 which can take over according to the load thereon.

Fourth Embodiment

Figure 25:
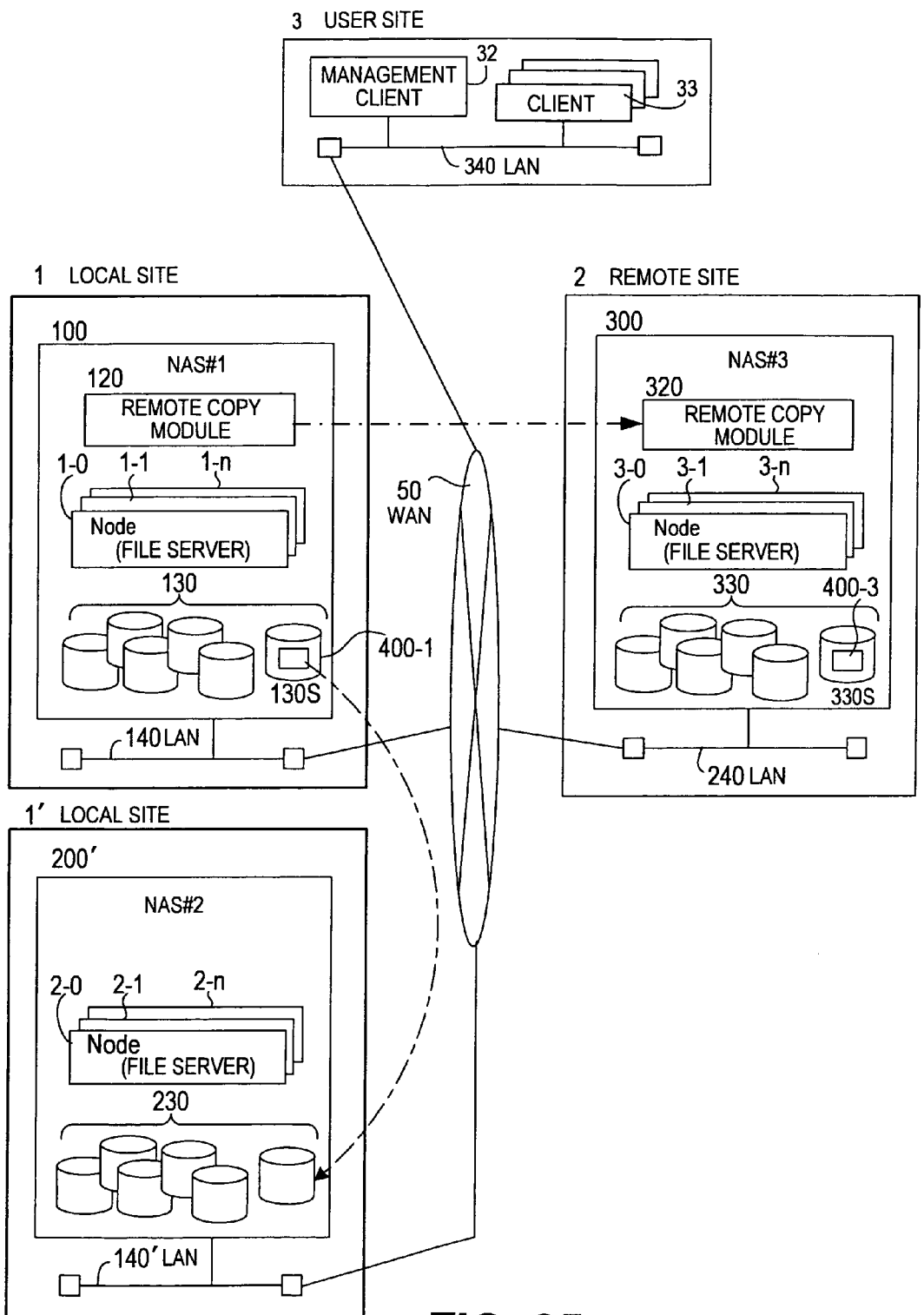
FIG. 25 shows a fourth embodiment, and is a block diagram showing a configuration of an overall system.

FIG. 25 shows a fourth embodiment, and the NAS 200 is separated as a second local site 1' from the local site 1 according to the first embodiment. The remote site 2 is the same as that of the first embodiment.

The second local site 1' includes an NAS 200', which is similar to the NAS 200 of the first embodiment. The NAS 200' is obtained by removing the shared LU and the remote copy module from the NAS 200 of the first embodiment, and other configuration is the same as that of the NAS 200 of the first embodiment. The second local site 1' is connected to the WAN 50 via a LAN 140', and can have access to the shared LU's of the local site 1 and of the remote site 2.

Though the second local site 1' does not have the remote copy module, the second local site 1' can have access to the shared LU's of other sites, such as the local site 1, via the WAN 50. Thus, a failover from the first local site 1 to the second local site 1' is realized by registering takeover information 400 of the second local site 1' to the shared LU 130S of the local site 1. Thus, this invention can be applied to a configuration including sites which are not remote-copied.

Namely, when there is at least one shared LU (shared logical volume) which can be accessed from a network which connects sites with each other, such as the WAN 50, the failover according to this invention can be realized by means of a storage system (NAS) without a remote copy module.

While the present invention has been described in detail and pictorially in the accompanying drawings, the present invention is not limited to such detail but covers various obvious modifications and equivalent arrangements, which fall within the purview of the appended claims.

What is claimed is:

1. A failover method used for a system,
   the system including:
      a primary site having:
      multiple nodes that provide a task; and
      a first storage system allocated to the nodes; and
      a secondary site having:
      multiple nodes that can provide a task; and
      a second storage system allocated to the nodes,
   the method allowing, if a failure occurs to a node of the primary site, the task to be taken over by a node of the primary site or a node of the secondary site,
   the method comprising the steps of:
   setting a priority of a failover for the respective nodes of the primary site;
   setting a failover destination of the respective nodes of the primary site to one of a node of the secondary site and a node of the primary site based on a correspondence set in advance between a priority and an extent of the failover destination;
   backing up data from a node of the primary site to a node of a determined failover destination;
   causing the node of the failover destination and the node of the primary site to mutually detect a failure; and
   causing the node of the failover destination to take over a task if the node of the failover destination detects a failure of the node of the primary site.

2. A failover method according to claim 1, wherein:
   the setting the priority sets a first priority or a second priority lower than the first priority based on availability of the node; and
   the setting the failover destination of the respective nodes of the primary site to a node of the secondary site or a node of the primary site sets the secondary site to the extent of the failover destination when the first priority is set to the node, and sets the primary site to the extent of the failover destination when the second priority is set to the node.

3. A failover method according to claim 2, further comprising the steps of:
   causing the secondary site to detect the number of failures that have occurred in the primary site; and
   causing the secondary site to take over in advance a task of a node of the primary site to which the first priority is set even if a failure is not occurring to the node when the number of the failures exceeds a predetermined upper limit.

4. A failover method according to claim 3, wherein:
   the causing the secondary site to take over a task in advance comprises the steps of:
   causing the node of the secondary site to take over the task of the node of the primary site to which the first priority is set; and
   causing a node of the secondary site to take over a task of a node of the primary site to which the second priority is set regardless of a presence of a failure after a predetermined grace period has elapsed.

5. A failover method according to claim 3, wherein:
   the causing the secondary site to detect the number of failures that have occurred in the primary site comprises the steps of:
   chronologically comparing the identifier of a task provided by a node with physical identifiers of the node; and
   detecting the number of the failures based on the number of previous physical identifiers of the node in consistent with the physical identifier of the node corresponding to the identifier of the task.

6. A failover method according to claim 1, wherein:
   the first storage system is an NAS system that provides the multiple nodes of the primary site with a file system, thereby assigning a storage volume to the respective nodes; and
   the node is set on a logical partition obtained by logically partitioning one computer resource.

7. A failover method according to claim 2, wherein:
   the setting a failover destination of the respective nodes of the primary site to one of a node of the secondary site and a node of the primary site comprises the steps of:
   searching for the failover destination in an extent corresponding to the priority set to the node; and
   extending the extent of the failover destination by changing the priority if there is no node to take over the task within the extent.

8. A failover method according to claim 1, wherein:
   the primary site and the secondary site are connected with each other via a network;
   at least one of the first storage system and the second storage system comprises a shared storage volume which can be accessed via the network;
   the shared storage volume stores information on the respective nodes of the primary site whose task is to be taken over; and
   the causing the node of the failover destination to take over a task obtains the information on the respective nodes of the primary site whose task is to be taken over, from the shared storage volume, and causing the node to take over the task based on the information on the node.

9. A failover method according to claim 1, wherein:
   the system further comprises a tertiary site;
   the tertiary site takes over a task of a node of the primary site when a failure occurs to the node of the primary site; and
   the tertiary site takes over a task in place of the secondary site when a failure occurs to a node of the primary site.

10. A backup system, comprising:
    a primary site comprising:
       multiple nodes that provide a task; and
       a first storage system allocated to the corresponding nodes;
    a secondary site comprising:
       multiple nodes that provide a task; and
       a second storage system allocated to the corresponding nodes; and
    a network connecting the primary site and the secondary site with each other; wherein:

a node of the secondary site takes over a task of a node of the primary site if a failure occurs to the node of the primary site;

the node of the primary site comprises:
- a priority setting unit for setting a priority of a failover for the respective nodes of the primary site;
- a cluster setting unit for setting a failover destination of the respective nodes of the primary site to one of a node of the secondary site and a node of the primary site based on the specified priority;
- a first failure detecting unit for cooperating with a node of the specified failover destination to monitor a failure;
- a backup processing unit for baking up data of itself to the node of the specified failover destination; and
- a first failover processing unit for taking over a task of the node to be monitored if the first failure detecting unit detects a failure; and the node of the secondary site comprises:
- a second failure detecting unit for cooperating with a node of a failover source to monitor a failure; and
- a second failover processing unit for causing the specified node to take over a task of the monitored node if a failure is detected.

11. A backup system according to claim 10, wherein:

the priority setting unit sets a first priority or a second priority lower than the first priority based on availability of the node of the primary site; and the cluster setting unit sets the secondary site to the extent of the failover destination when the first priority is set to the node, and sets the primary site to the extent of the failover destination when the second priority is set to the node.

12. A backup system according to claim 11, wherein:

the node of the secondary site comprises a backup source monitoring unit for detecting the number of failures that have occurred in the primary site; and the second failover processing unit takes over in advance a task of a node of the primary site to which the first priority is set even if a failure is not occurring to the node when the number of failures exceeds a predetermined upper limit.

13. A backup system according to claim 12, wherein:

the second failover processing unit takes over a task of a node of the primary site to which the second priority is set regardless of a presence of a failure of the node of the primary site after a predetermined grace period has elapsed since that start of the takeover of a task of a node of the primary site to which the first priority is set.

14. A backup system according to claim 12, wherein:

the backup source monitoring unit chronologically compares an identifier of a task provided by a node of the primary site with physical identifiers of the node, and detects the number of the failures based on the number of previous physical identifiers of the node in consistent with the physical identifier of the node corresponding to the identifier of the task.

15. A backup system according to claim 10, wherein:

the first storage system is an NAS system that provides the multiple nodes of the primary site with a file system, thereby assigning a storage volume to the respective nodes; and the node is set on a logical partition obtained by logically partitioning one computer resource.

16. A backup system according to claim 11, wherein:

the cluster setting unit searches for the failover destination in an extent corresponding to the priority set to the node of the primary site, and extends the extent of the failover destination by changing the priority if there is no node to take over the task within the extent.

17. A backup system according to claim 10, wherein:

at least one of the first storage system and the second storage system comprises a shared storage volume which can be accessed via the network;

the cluster setting unit stores information on the respective nodes of the primary site whose task is to be taken over, in the shared storage volume; and the second failover processing unit obtains the information on the respective nodes of the primary site whose task is to be taken over, from the shared storage volume, and causing the node to take over the task based on the information on the node.

* * * * *